(12) United States Patent
Weaver et al.

(10) Patent No.: US 12,019,501 B2
(45) Date of Patent: Jun. 25, 2024

(54) SYSTEM AND METHOD FOR MARKING SUBSTRATES WITHIN IMPROVED LINE RECOVERY TIME

(71) Applicant: Videojet Technologies Inc., Wood Dale, IL (US)

(72) Inventors: Robert Weaver, Wood Dale, IL (US); John P. Folkers, Palatine, IL (US); Fred Susi, Wood Dale, IL (US); Robert Smith, Thrapston (GB)

(73) Assignee: Videojet Technologies Inc., Wood Dale, IL (US)

( * ) Notice: Subject to any disclaimer, the term of this patent is extended or adjusted under 35 U.S.C. 154(b) by 236 days.

(21) Appl. No.: 17/618,772

(22) PCT Filed: Jun. 12, 2020

(86) PCT No.: PCT/US2020/037555
§ 371 (c)(1),
(2) Date: Dec. 13, 2021

(87) PCT Pub. No.: WO2020/252357
PCT Pub. Date: Dec. 17, 2020

(65) Prior Publication Data
US 2022/0261303 A1    Aug. 18, 2022

Related U.S. Application Data

(60) Provisional application No. 62/861,023, filed on Jun. 13, 2019.

(51) Int. Cl.
*G06F 11/07* (2006.01)
*G06F 3/12* (2006.01)
*G06Q 10/20* (2023.01)

(52) U.S. Cl.
CPC .......... *G06F 11/0733* (2013.01); *G06F 3/121* (2013.01); *G06F 3/1234* (2013.01); *G06F 3/1282* (2013.01); *G06Q 10/20* (2013.01)

(58) Field of Classification Search
CPC .... G06F 11/0733; G06F 3/1234; G06F 3/121; G06F 3/1282; G06Q 10/20
(Continued)

(56) References Cited

U.S. PATENT DOCUMENTS 7,096,158 B2    8/2006  Kitada et al.
7,180,623 B2    2/2007  Kato
(Continued)

FOREIGN PATENT DOCUMENTS

CN    106130789    11/2016
CN    107000435    8/2017
(Continued)

OTHER PUBLICATIONS

PCT/US2020/037555 Extended European Search Report, dated Jan. 3, 2023, 13 pages.
(Continued)

*Primary Examiner* — Jamares Q Washington
(74) *Attorney, Agent, or Firm* — Delizio, Peacock, Lewin & Guerra, LLP

(57) ABSTRACT

A system having a plurality of marking and/or coding devices and a computing system coupled to the devices and having processor configured to: receive sensor data associated with each device; and store printer metadata and batch job metadata in a backup file for each device. The processor is configured to classify a fault condition of a respective one device based on one or more of received sensor data, device self-test data, current operational data and historical device condition data. The processor is configured to determine autonomously a repair process recommendation in response
(Continued)

to the classified fault condition and based on an estimated time to repair (ETR) the device using a self-repair recovery process relative to a line recovery time (LRT) threshold. The processor is configured to recommend as the repair process recommendation the self-repair recovery process in response to the ETR being less than or equal to the LRT threshold.

22 Claims, 18 Drawing Sheets

(58) Field of Classification Search
USPC .................. 399/19, 11; 347/19; 700/79, 82
See application file for complete search history.

(56) References Cited

U.S. PATENT DOCUMENTS

| | | | |
|---|---|---|---|
| 7,536,595 B1* | 5/2009 | Hiltunen | G06F 11/0793 |
| | | | 714/26 |
| 2005/0027486 A1 | 2/2005 | Kitada et al. | |
| 2006/0092097 A1* | 5/2006 | Reddy | H04N 1/00204 |
| | | | 345/2.1 |
| 2009/0135220 A1 | 5/2009 | German et al. | |
| 2012/0284077 A1 | 11/2012 | Xiao et al. | |
| 2013/0114100 A1 | 5/2013 | Torii et al. | |
| 2016/0098234 A1* | 4/2016 | Weaver | G06F 3/1234 |
| | | | 358/1.15 |
| 2016/0378584 A1* | 12/2016 | Oku | H04N 1/00079 |
| | | | 358/1.14 |

FOREIGN PATENT DOCUMENTS

| | | |
|---|---|---|
| CN | 107612756 | 1/2018 |
| CN | 107621928 | 1/2018 |
| CN | 107862393 | 3/2018 |
| CN | 109844886 | 6/2019 |
| WO | 2019070290 A1 | 4/2019 |

OTHER PUBLICATIONS

PCT/US2020/037555 International Search Report and Written Opinion, dated Aug. 19, 2020, 8 pages.
"CN Application No. 202080043186.2 First Office Action", Jan. 18, 24, 20 pages.

* cited by examiner

1000

```
┌─────────────────────────────────────────────────────────────┐ 1002
│ Generating a report via the Remote Service dashboard that    │/
│ details the performance and value created by Line Recovery   │
│ Time (LRT) for a facility. This will be implemented in the   │
│ VRS dashboard and accessible by Operations Managers and or   │
│ personnel designated                                         │
└─────────────────────────────────────────────────────────────┘
                              │
                              ▼                                 1004
┌─────────────────────────────────────────────────────────────┐/
│ Generating in the report the number of failures that         │
│ occurred in a specified period by printer and in total       │
│ [faults that resulted in more than 1 minute of no printing]  │
└─────────────────────────────────────────────────────────────┘
                              │                                 1006
                              ▼                                /
┌─────────────────────────────────────────────────────────────┐
│ Calculating and identifying in the report the number of      │
│ failures self-repaired vs. spares deployed [number of times  │
│ the Operator successfully self-repaired a printer based on   │
│ Operator feedback to Classifier, number of spares deployed   │
│ based on number of backups that were restored within 20      │
│ minutes or restoration time interface (RTI)]                 │
└─────────────────────────────────────────────────────────────┘
                              │                                 1008
                              ▼                                /
┌─────────────────────────────────────────────────────────────┐
│ Calculating and identifying, in the report the number of     │
│ downtime minutes by printer or by site [downtime is          │
│ calculated as time from failure to self-repair or spare      │
│ deployment completion]                                       │
└─────────────────────────────────────────────────────────────┘
                              │                                 1010
                              ▼                                /
┌─────────────────────────────────────────────────────────────┐
│ Identifying in the report production downtime per printer    │
│ failure compared to "theoretical would have been downtime"   │
│ for value illustration [actual recovery time per event vs.   │
│ a standard 50 minutes                                        │
└─────────────────────────────────────────────────────────────┘
                              │                                 1012
                              ▼                                /
┌─────────────────────────────────────────────────────────────┐
│ Calculating and identifying in the report the number of      │
│ Self-Repair opportunities vs. the number of times Operators  │
│ opted to deploy spare instead of attempt repair              │
└─────────────────────────────────────────────────────────────┘
                              │                                 1014
                              ▼                                /
┌─────────────────────────────────────────────────────────────┐
│ Calculating and identifying in the report the number of      │
│ Spare deployment opportunities vs. the number of time the    │
│ Operators opted to attempt repair instead of deploying spare │
└─────────────────────────────────────────────────────────────┘
```

FIG. 10

SYSTEM AND METHOD FOR MARKING SUBSTRATES WITHIN IMPROVED LINE RECOVERY TIME

BACKGROUND

Embodiments relate to a system and a method for minimizing, improving and monitoring production line recovery time in response to a detected failure of a marking and coding device.

Production downtime due to industrial printer failures (faults that stop printer from printing) mostly impacts medium to large customers due to various reasons such as limited excess capacity in 24×7 operations, regulated products such as in pharmaceuticals, and products that spoil such as in the dairy.

SUMMARY

Embodiments relate to a system and a method for improved line recovery time. A method comprising receiving sensor data associated with a marking and/or coding device. The method includes classifying, by a classifying module, a fault condition based on one or more of received sensor data, device self-test data, current operational data and historical device condition data. The method includes determining autonomously a repair process recommendation, in response to the classified fault condition and based on an estimated time to repair (ETR) a non-working, non-coding and/or non-marking device using a self-repair recovery process relative to a line recovery time (LRT) threshold. The method includes recommending, by the at least one processor, the self-repair recovery process in response to the ETR being less than or equal to the LRT threshold.

A system comprising a plurality of devices and a computing system coupled to the devices and having at least one processor configured to: receive sensor data associated with each device. The at least one processor configured to receive sensor data associated with each device of the plurality of devices and store device metadata and batch job metadata in a backup file for each device. The at least one processor is configured to classify, by a classifying module, a fault condition of a respective one device based on one or more of received sensor data, printer self-test data, current operational data and historical device condition data. The processor is configured to determine autonomously a repair process recommendation, in response to the classified fault condition and based on an estimated time to repair (ETR) a non-working device using a self-repair recovery process relative to a line recovery time (LRT) threshold. The processor to recommend, by the at least one processor, as the repair process recommendation the self-repair recovery process in response to the ETR being less than or equal to the LRT threshold.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 10 illustrates a flowchart of a process or method for self-repair,

DETAILED DESCRIPTION

Figure 1:
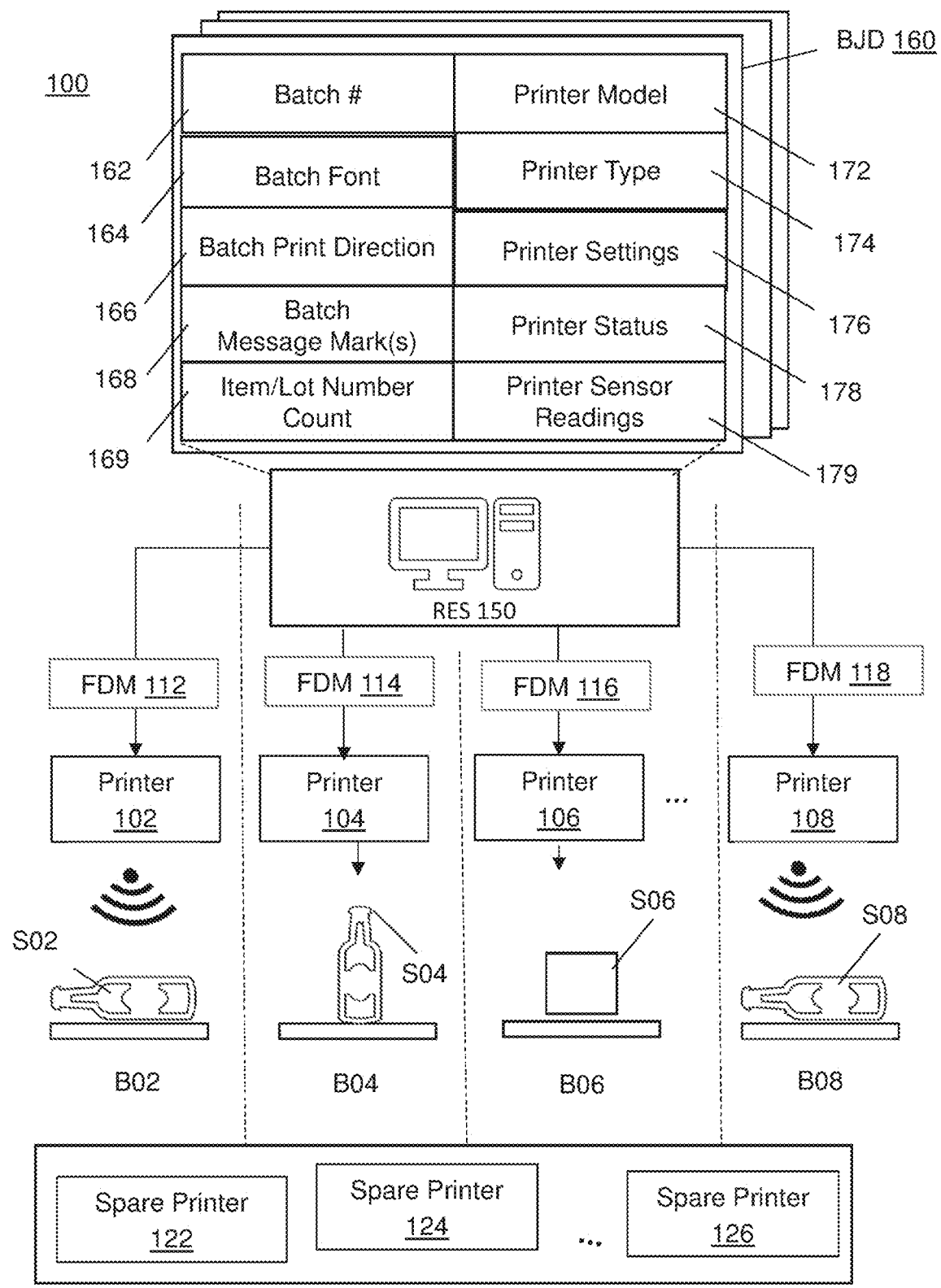
FIG. 1 illustrates a block diagram of a system for marking substrates with an improved line recovery time (LRT)

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10. e.g., 1 to 4.

While the invention is described in reference to an industrial printer such as a continuous inkjet printer, the invention is not so limited and encompasses a variety of marking and/or coding devices such as laser marking devices, thermal transfer overprinters (TTO), thermal inkjet printers (TIJ), continuous inkjet printers (CIJ), label coding machines etc.

The following terms are defined as follows.

Remote Monitoring Service (RMS): A cloud-based solution that enables remote monitoring through email alerts, diagnostics, repair and is available to both company technical support and customer maintenance teams.

Warning: A condition of which the user should be aware and likely rectify but does not stop the printer from functioning.

Self-Repairable: a printer failure that can be resolved by an operator/technician with or without remote assistance in less than a predetermined line recovery time (LRT) threshold with or without a part replacement needed. The predetermined LRT threshold may be 20 minutes, for example. The failure/fault is resolved without same failures/faults occurring again in at least a 24-hour period.

Classifier: Cloud-based analytics tool that identifies if a printer failure is self-repairable or if a spare printer needs to be deployed. The cloud-based analytics tool may use machine learning techniques to classify the self-repairable faults.

Remote Edge Server (RES): A network computing device placed at the customer site for collecting and transferring printer data from one or more printers to a cloud device.

Actual Line Recovery Time (LRT): The actual time to recover production from a printer failure/fault at or below the predetermined LRT threshold. Actual LRT is measured from the time the customer acknowledges the failure until the printer is back online and printing.

Accelerated Printer Restore (APR): A process by which the system may backup a failed printer and restore backups on to a spare printer to accelerate spare swaps by an operator/technician.

Backup File: The file stored on the RES for replicating features of a failed printer on a spare printer. The Backup File content may include printer parameters, printer settings, batch job details, batch job counters, etc., that replicates essentially current printer and current batch metadata. The Backup File will be limited to 1 per printer with the most recent (up-to-date) update. Not limited to an edge server other storage medium.

Printer metadata: Represents data associated with one or more of printer settings, ink color, serial number, printer type, printer model, printer sensors, by way of non-limiting example.

Batch metadata: Represents data associated with a batch job necessary for carrying out the marking of a mark(s) on a substrate.

FIG. 1 illustrates a block diagram of a system 100 for marking substrates with an improved line recovery time (LRT). The system 100 may include a recovery edge server (RES) 150 and one or more printers 102, 104, 106, and 108 in wired or wireless communication with the RES 150. As can be appreciated, a site may have different types of printers to apply various types of markings on a variety of substrates S02, S04, S06, S06 and S08. The substrates S02 and S08 may be the same substrate but being marked by different printers. Substrate S04 may be a bottle cap type. Substrate S06 may be a paper product type substrate. This list of substrates is not meant to be limiting in any way. Substrates may include non-porous or porous substrates, plastic, paper, foil, cardboard, glass, metal, or other materials.

The printers 102, 104, 106, and 108 may be an inkjet printer, continuous inkjet (CIJ) printer, a laser marking device, thermal transfer printer, by way of non-limiting examples. Assume that printer 102 marks batch B02; printer 104 marks batch B04; printer 106 marks batch B06; and printer 108 marks batch B08. Each batch may be different requiring each different printer to be programmed with a different set of batch instructions or data.

Figure 12:
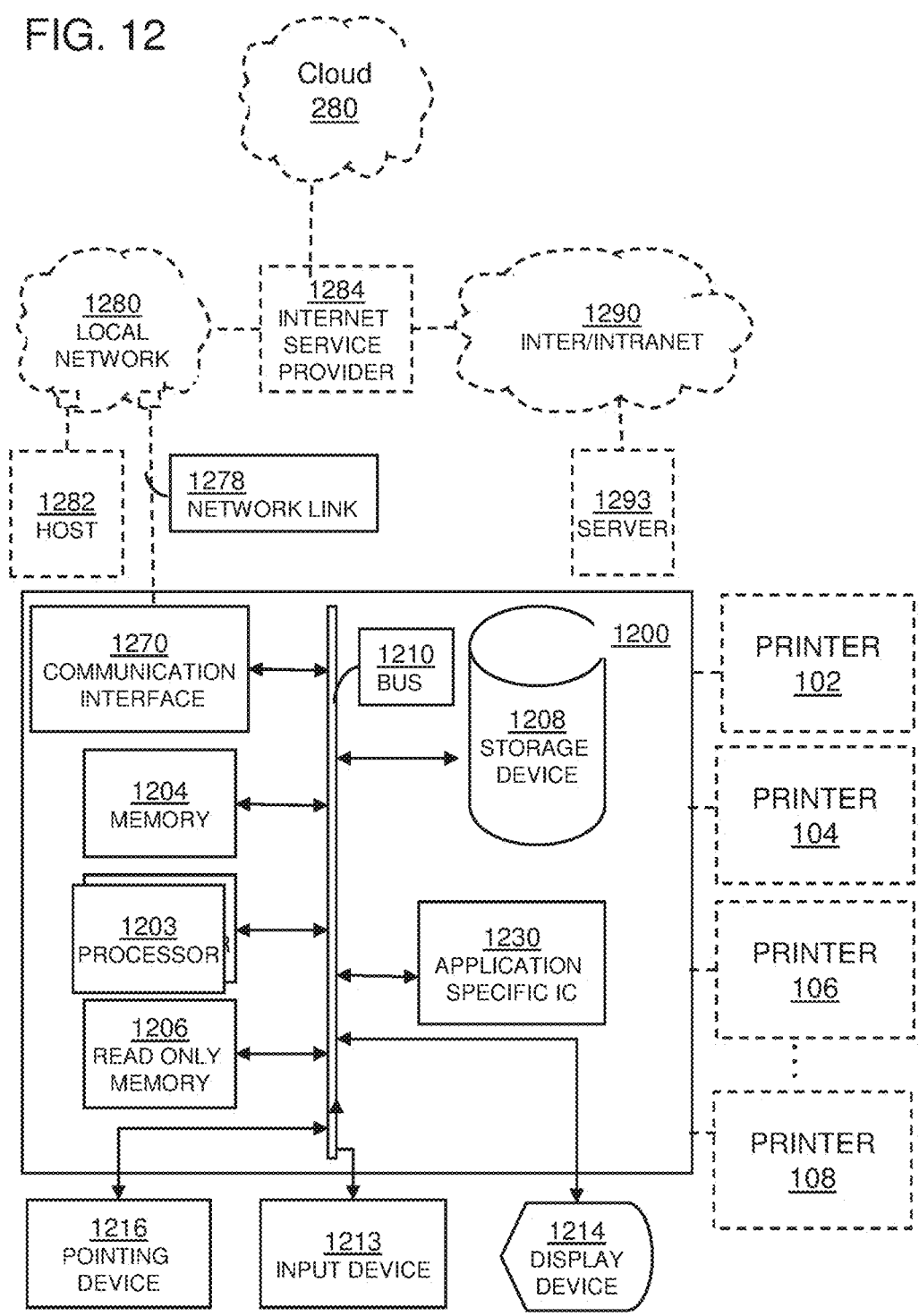
FIG. 12 illustrates a block diagram of a computing system.

The RES 150 may include a batch job database (BJD) 160 stored in a memory device (FIG. 12). The BJD 160 may include data representative of one or more of a batch number 162, batch font(s) 164, batch print direction 166, batch message mark(s) 168 and item/lot number count 169. The BJD 160 may include data representative of one or more of printer model 172, printer type 174, printer settings 176, printer status 178 and printer sensor readings 179.

The system 100 may include one or more fault detection monitors (FDM) 112, 114, 116, and 118. The FDM may include sensors in the printers with software distributed between the printers and the RES 150 or another controller to detect a fault condition. A fault condition as used herein is a condition which prevents a printer from printing.

The system 100 may include one or more spare printers 122, 124, and 126. During operation, printers may be configured to be monitored by internal sensors to determine the health and status of the printer. The RES 150 may be configured to receive and track sensor data (not shown), as disclosed for example in U.S. Pat. No. 9,524,132, titled "SYSTEM AND METHOD FOR REMOTELY SERVICING AN INDUSTRIAL PRINTER." issued on Dec. 20, 2016 and assigned to Videojet Technologies, Inc. Printers may include various sensors which monitor one or more components of the printer. Some sensors are used to track quantities of printer consumables, such as, by way of non-limiting example, ink and solvents. Monitoring the heath or remaining useful life (RUL) of machines well known in the art. Some of these repairs and/or maintenance, such as replacement of depleted consumables are needed from time to time. These repairs may be scheduled. However, such maintenance activity requires the printer to be offline.

For example, in some embodiments, a nozzle component has a temperature sensor, a jet velocity sensor, a pressure sensor, a modulation voltage sensor, a modulation current sensor and a modulation frequency sensor. Other example components and associated sensors for a continuous ink printer are possible.

For example, there may be various sensors for various components in the printhead, ink system, consumables, and electronics for detecting or determining faults or fault conditions associated with these subsystems or components thereof. The sensors provide information on parameters related to the corresponding component. The combined information from the various sensors from various components provide unprecedented amounts of information on the status of various systems in the printer to allow a remote user to diagnose, predict and/or determine potential issues, such as faults, warnings, or failures, with the printer and its subsystems. The printhead (and associated electronics) may include a nozzle with sensor parameters such as the modulation voltage setpoint, modulation current, frequency, temperature, jet velocity setpoint, actual velocity, target pressure, temperature-compensated target pressure, and actual pressure; phase sensor parameters including selected phase, phase rate of change, profile, and phase threshold; EHT parameters such as voltage, current, trip value, and % of trip; gutter parameters such as build up, time since last clean, warning level setting, and presence of ink in gutter; printhead heater parameters such as set temperature, actual temperature, and drive; printhead cover parameters such as status (on or off) and time since last removed; the status of various printhead valves (open, closed, and time open or closed); nozzle parameters such as nozzle size, target velocity, serial number, manufacture date, drop frequency, print count, run hours, and drops deflected. Again, these parameters are monitored for diagnosing and determining potential or existing faults associated with the various components.

The ink system (e.g. consumables and associated electronics) may include sensors for monitoring printing operating parameters and the associated data may be used to detect, diagnose, or determine potential problems such as faults, warnings, or failures. The sensors may be configured to monitor, for example, ink pump parameters such as pressure, speed, current, and pump run hours; ink reservoir parameters such as ink type, ink expiry date, fluid level (ml and/or %), print hours remaining, and ink tank temperature; make up reservoir parameters such as make up type, expiry date, makeup vacuum, fluid level (ml and/or %), print hours remaining, and makeup tank temp; viscometer parameters such as target time to empty, actual time to empty, density, viscosity, and fill time; ink quality parameters such as ink conductivity; condenser parameters such as status (on or off), temperature, and vent valve (on or off); filter/damper module parameters such as ink filter pressure drop, serial number, manufacture date, run hours, and replacement date; service module parameters such as flush pump speed, flush pump current, serial number, manufacture date, run hours, replacement date, and information for various service module valves (open, closed, and time open or closed); ink cartridge parameters such as ink type, recommended make up type, serial number, manufacture date, expiry date, cartridge size, fluid level, run elapsed time, time to cartridge replacement, number of cartridge insertions, viscosity coefficient(s), fluid density, modulation algorithm numbers, and cold start algorithm numbers; make up cartridge parameters such as makeup type, serial number, manufacture date, expiry date, cartridge size, fluid level, run elapsed time, time to cartridge replacement, and number of insertions. Other printer parameters include air filter parameters such as date last replaced, run hours, and replacement date; fume/gas sensors within the printer cabinet; humidity sensors within the printer or for ambient measurement; main control board parameters such as time and date, electronics temperature. HV voltage. HV Current, and the voltage of various other power supplies within the electronics.

There are other faults which may be detected by sensors for reasons other than depletion of consumables. Some components of a printer may require maintenance based on a time interval or a number of operations, which may require the printer to be placed offline. Especially for an industrial complex at least one technician may be available to perform the maintenance tasks. In other instances, some repairs may be aided by remote servicing via a remote monitoring service (RMS) platform. U.S. Pat. No. 9,524,132 also describes an example of a remote monitoring service (RMS) platform to aid in repairing and/or maintaining a printer remotely, by way of non-limiting example.

The Applicant has found that up to 80% of faults or fault conditions are associated with the ink system operating parameters, in particular the makeup reservoir (makeup reservoir faults), and the print head operating parameters, and in particular the gutter (gutter faults) and EHT (EHT faults).

Figure 2A:
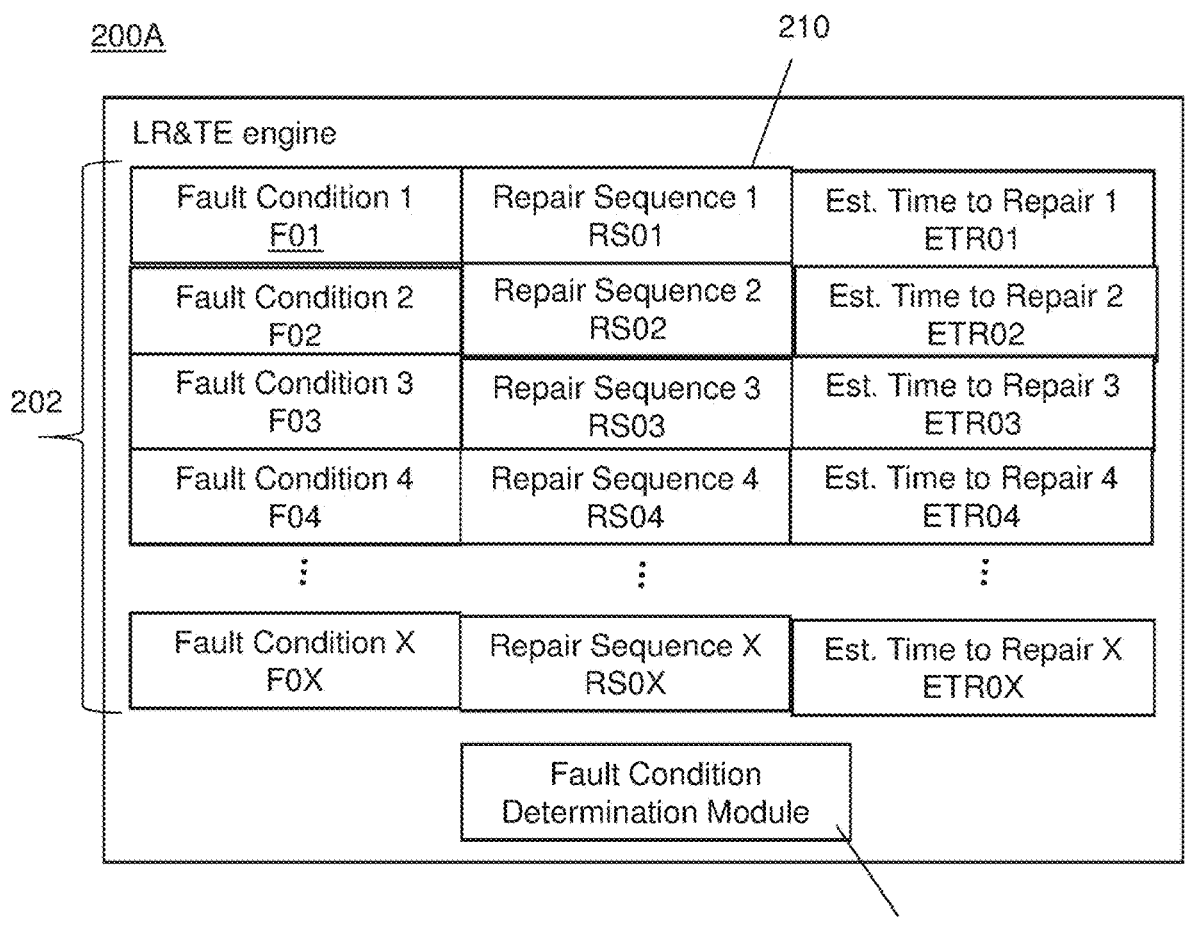
FIG. 2A illustrates block diagram of a line recovery and time estimator (LR&TE) engine.

FIG. 2A illustrates block diagram of a line recovery and time estimator (LR&TE) engine 200A. The LR&TE engine 200A may include program code instructions which when executed the system to determine a fault condition of a plurality of fault conditions based on real-time sensor data derived from sensors of a respective one operating printer. Fault conditions may be based on historical sensor data for a particular printer model/type. Fault conditions may be based on the age of a printer as well.

The engine 200A may include a fault condition determination module 240 which may query a database 202 of fault conditions such as fault condition 1 F01, fault condition 2 F02, fault condition 3 F03, fault condition 4 F04, . . . fault condition X FOX. Each fault condition may have been associated therewith a repair sequence (RS) to repair the fault/failure and an estimated time to repair (ETR). As a result, fault condition 1 F01 has a repair sequence 1 RS01 and associated estimated time to repair 1 ETR01. Accordingly, fault condition 2 F02 has a repair sequence 2 RS02 and associated estimated time to repair 2 ETR02. Fault condition 3 F03 has a repair sequence 3 RS03 and associated estimated time to repair 3 ETR03. Fault condition 4 F04 has a repair sequence 4 RSO4 and associated estimated time to repair 4 ETR04. Fault condition X FOX has a repair sequence X RS0X and associated estimated time to repair X ETR0X. The estimated time to repair may be a learned value based on historical data. The estimated time to repair (ETR) is a function of a printer's downtime. When the printer is down, the printer cannot print. Assume that in some embodiments, self-repairs can take place essentially immediately.

Figure 2B:
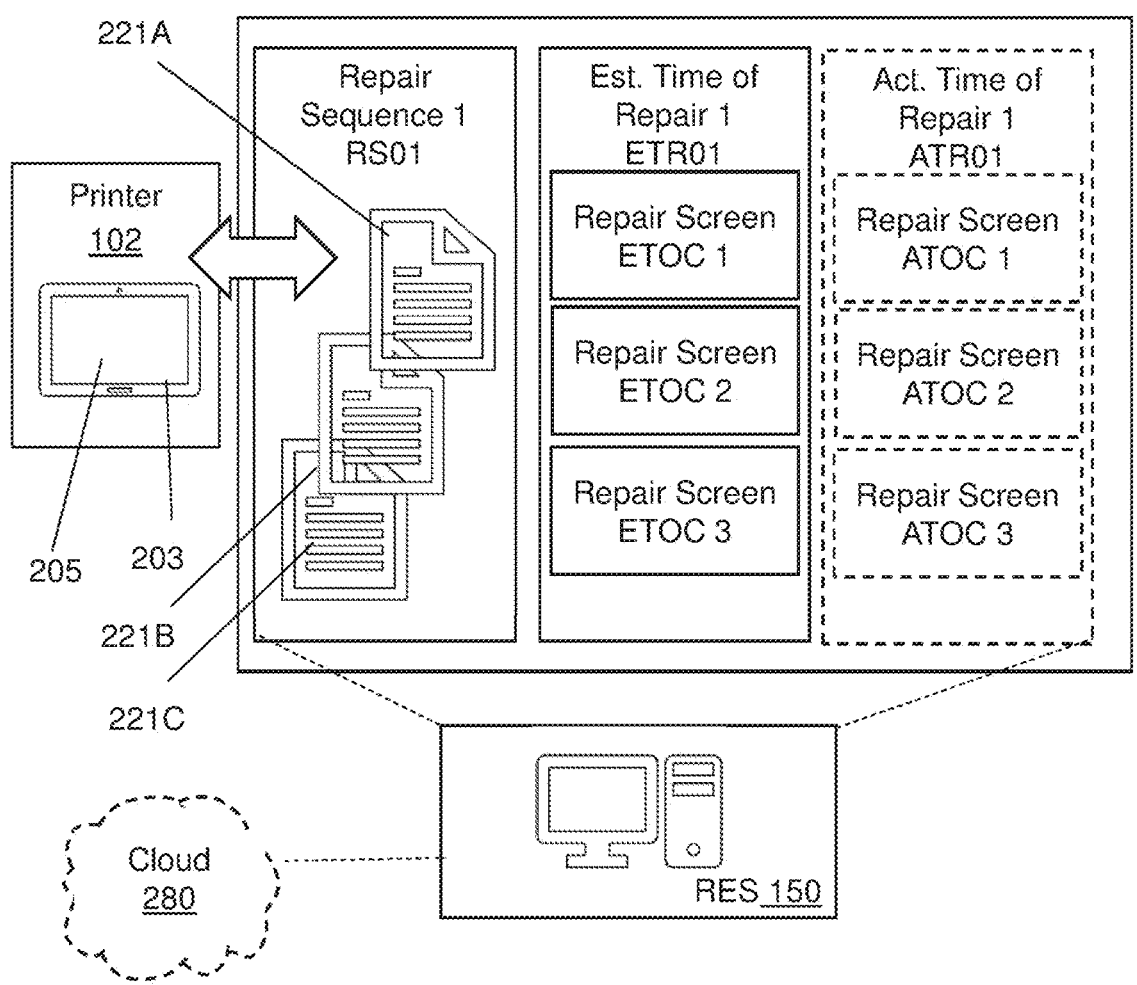
FIG. 2B illustrates a block diagram of a line recovery time estimator sub-module.

Referring also to FIG. 2B, a block diagram of a LR&TE sub-module 250 is illustrated. The sub-module 250 is a row 210 in the database 202 for the engine 200A of FIG. 2A. For each fault condition, such as fault condition 1 F01, a repair sequence 1 RS01 allows for self-repair of the printer without the need for replacing the printer as a whole. In the illustrated example, assume printer 102 has a display device 203 having a screen 205. The repair sequence 1 RS01 includes a plurality of instruction sets 221A. 221B and 221C displayed as graphical user interfaces (FIGS. 9A-9H). Each instruction set 221A, 221B, and 221C being individually displayed serially on the screen 205 to provide instructions to a technician or user and prompt the user when the instructions associated with those on the screen are complete. The term "row" is used herein to represent elements which are linked together. While the description herein provides for a single database 202, the database 202 may include multiple databases. For example, each row may be a separate database. Alternately, each column may be a separate database each linked appropriately.

The engine 200A may estimate the time to complete instructions of instruction set 221A wherein each set may have a repair screen being associated with a repair screen estimate time of completion (ETOC) 1. Likewise, the engine 200A may estimate that the time to complete instructions of instruction set 221B has a repair screen estimate time of completion (ETOC) 2. The engine 200A may estimate that the time to complete instructions of instruction set 221C has a repair screen estimate time of completion (ETOC) 3. The instruction sets may be interactive repair instructions which require input by the technician before the next set of instructions and be displayed. The engine during the interactive repair instructions may track the actual time the technician needed to complete the repair for a particular instruction set on a particular screen. This may be used to update or train the estimated time of repairs.

The RES 150 may be coupled directly or indirectly to a cloud or cloud engine. The cloud may include the data of the database 202. The cloud 280 may be updated with the actual time of repair 1 (ATR01) so that the estimated time of repair may be trained and updated. The ATR01 may be a function of the time to complete the repair sequence. The ATR01 is a function of the accumulated time corresponding to the actual time of completion (ATOC) to complete instructions or progress time to complete each screen. In this example, the ATOC is a function of the actual time of completion 1 (ATOC1) repair instructions of a first repair screen; the actual time of completion 2 (ATOC2) repair instructions of a second repair screen; and the actual time of completion (ATOC3) repair instructions of a third repair screen. The number of screens may vary. However, for illustrative purposes only three repair screens are shown. The cloud 280 may receive data maintained for reports as will be described below in relation to FIGS. 11A and 11B. The cloud 280 may be a remote monitoring service (RMS) cloud.

Figure 3A:
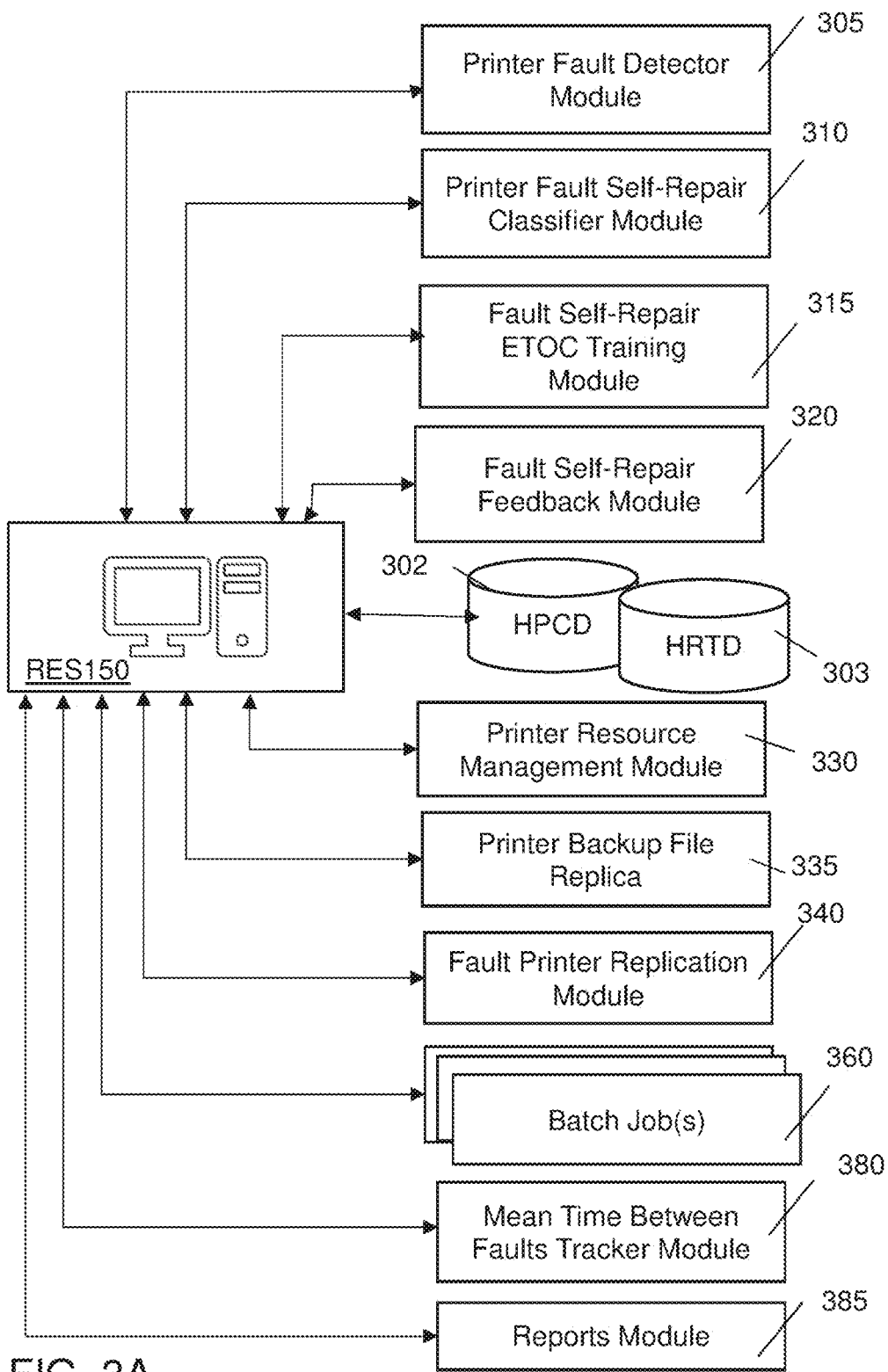
FIG. 3A illustrates a block diagram of a recovery edge server.

FIG. 3A illustrates a block diagram of a recovery edge server (RES) 150. The recovery server may be a network server coupled to a network having a plurality of printers coupled to the network. The RES 150 may include in or more of a printer fault detector module (FDM) 305; a printer fault classifier module 310; a fault self-repair ETOC training module 315; a fault self-repair feedback module 320; printer resource management module 330; a printer backup file replica 335; fault printer replication module 340; batch job(s) 360; a repair statistics and mean time between faults tracker module 380; and reports module 385. The invention is not limited to the use of an edge server, and other data backup devices may be used for storing backup data.

The RES 150 may be coupled to a historical printer condition(s) data (HPCD) database 302. The HPCD database 302 may store data associated with a historical state of a printer, as will be described in more detail in relation to FIG. 3B. For example, all of the prior collected data may be used to predict a fault condition and a time to repair.

Additionally, the HPCD data may be used to determine an estimated time to the next fault. The RES 150 may include a historical repair/timing data (HRTD) database 303. The HRTD may include historical metrics based on other operators for the same printer type and condition. The HRTD may include timing data based on successes of repairs.

The RES 150 may include a repair process recommendation module 325 configured to determining autonomously a repair process recommendation, in response to the classified fault condition and based on an estimated time to repair (ETR) a non-printing (faulted) printer using a self-repair recovery process relative to a line recovery time (LRT) threshold. A graphical user interface may be employed to provide the operator or technician the recommendation. The repair process recommendation of the self-repair recovery process may be in response to the ETR being less than or equal to the LRT threshold.

One or more of the modules may be distributed between one or more computing devices, network servers (i.e., RES 150), cloud 280 and/or printers. The printer fault detector module (FDM) 305 is configured to determine a fault of a printer based on internal sensors within the printer or other status indicators. The printer fault classifier module 310 may use current sensor data to determine a fault condition as shown in FIG. 2A. This information is used by the method 500 of FIG. 5, described below. The ETOC is used to recommend to the operator or technician whether to replace the faulted printer with a spare or recommend a self-repair process. The classifier module 310 may determine the current state of printer plus historic data from cloud storage.

The fault self-repair ETOC training module 315 will receive feedback from the fault self-repair feedback module 320 based on the operator's or technician's interactions during the repair process of a faulted printer. The feedback may also determine data representative of successful completion of repair. The ETOC training module 315 will train repair modules to improve the accuracy in line recovery time. For example, if repairs are not successful in the allotted time, then the self-repair process may not be recommended in the future. Alternately, revisions to the self-repair process can be made to reduce the allotted time while being able to accomplish self-repair using a technician.

The fault self-repair feedback module 320 tracks the interactions during a self-repair process for training purposes. The printer resource management module 325 may track and identify all printers within a site or those specifically coupled to or managed by the RES 150. For example, some spare printers may be tracked by the RES 150 and set with an offline or idle status. In other instances, a spare printer may not be in communication with the RES 150. In other instances, operating printers which are online may have an offline status. However, operating printers are not considered spares if in use printing a batch job. In some embodiments, the technician or operator may be sent a communication representative of a list of compatible spare printers that may be available on site. A customer site may have multiple buildings. As can be appreciated from the description herein, a spare printer in a customer's building in a different city, state, country may not be available as a "spare" since the time to acquire the spare printer may exceed the LRT threshold.

The printer backup file replica 335 is an up-to-date file of a printer setting and batch job setting and counters. The printer backup file replica 335 may be up-to-the-minute printer metadata replica. The term "printer metadata" represents current settings, counters, font type, etc. used for a current batch job. In some instances, the internet protocol (IP) address may not be copied or replicated when the spare printer is brought online. One reason to backup the printer metadata and batch job metadata is that entering the print information and batch job information back into the spare printer can be time consuming. The data may include a lot code, counters expiration date, font, printing direction (i.e., left to right), and other instructions used to apply symbols and/or alphanumeric characters representative of the mark.

The fault printer replication module 340 may be configured to replicate the metadata of a faulted printer on a spare printer so that the spare printer may pickup right where the faulted printer left off. In some instances, this will eliminate waste. The spare printer can start printing the very next batch number without the need to hunt and find a match up in the count of the spare printer. Using the fault printer replication module 340 may allow the operator to find the backup file in a file repository and download the backup file to the spare printer. The fault printer replication module 340 may be configured to replicate the faulted printer by the spare printer by downloading the stored printer metadata and batch job metadata to configure the spare printer.

The batch job(s) 360 are stored and tracked by the RES 150 and/or cloud 280 including beginning and ending batch jobs according to the metadata or settings. The mean time between faults tracker module 380 may determine the mean time between faults and specifically, the mean time between faults of a self-repaired printer. Some repairs are a patch with an expected short time between faults. Other self-repairs may be performed based on an expected duration for which the repair will last (means time between faults). Some self-repairs may be selected in a manner which may extend the expected time to next fault before a full fix or full repair can be completed.

Figure 11A:
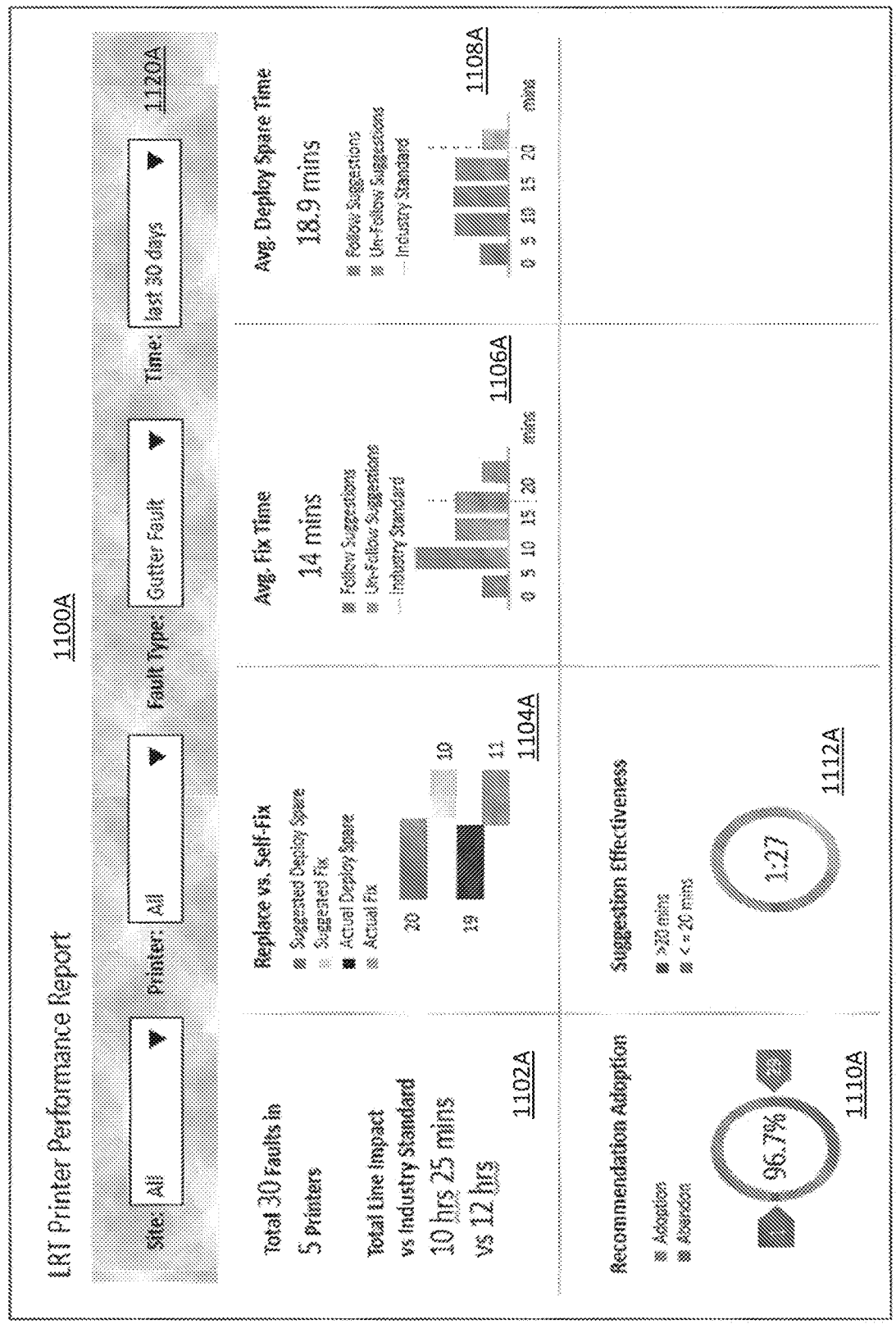
FIGS. 11A-11B illustrates graphical user interfaces for displaying reports.
Figure 11B:

The reports module 385 may allow the operator or technician to review metrics associated with the use of self-repairs to extend the batch job operations. Some batch jobs include products with a shelf life that can cause the product to spoil if there are lengthy delays in the marking process. Example reports are shown in FIGS. 11A-11B.

Figure 3B:
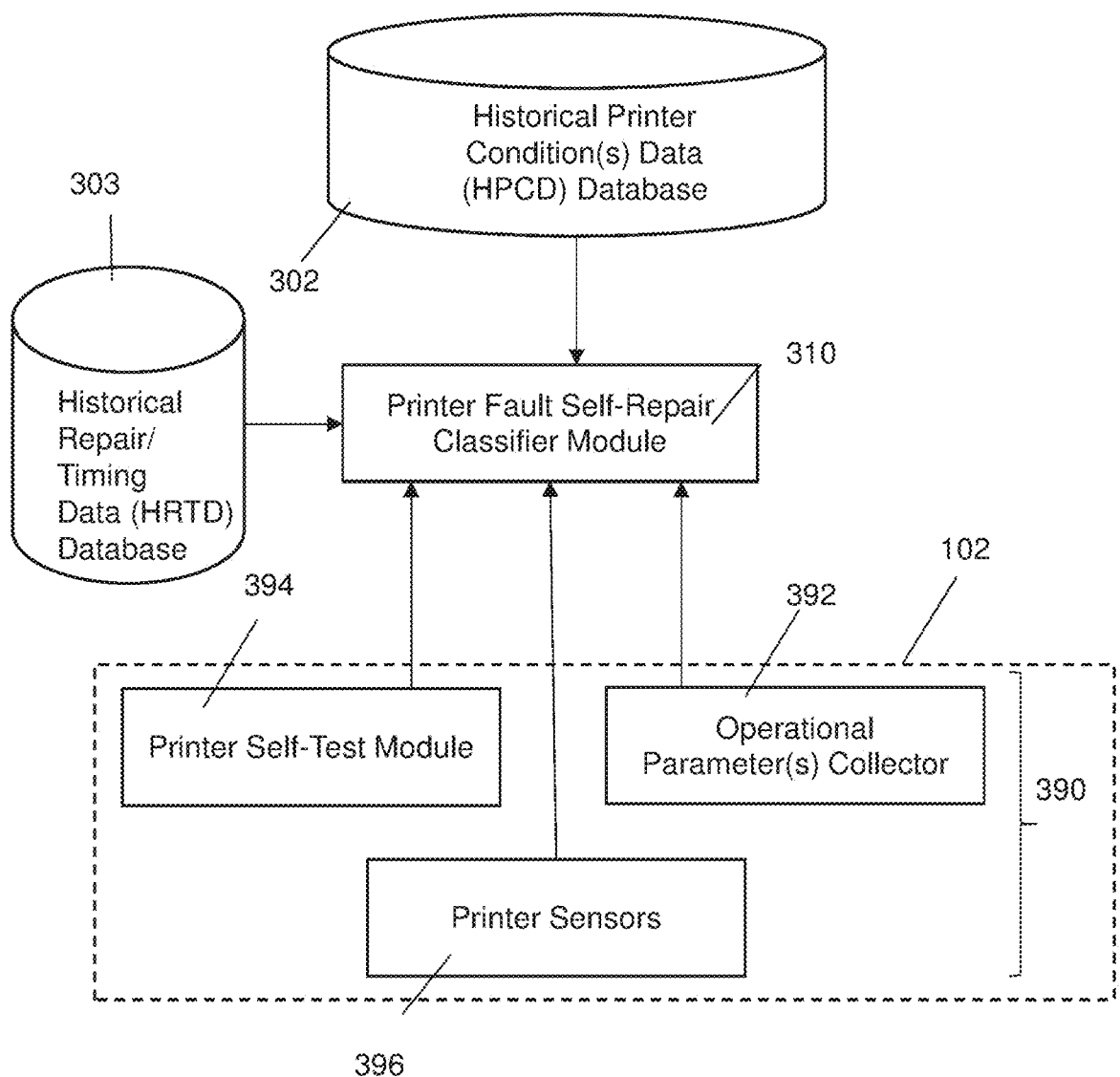
FIG. 3B illustrates a block diagram of a flow process for the classifier module.

FIG. 3B illustrates a block diagram of a flow process for the printer fault self-repair classifier module 310. Before, discussing training of the classifier module, additional operations of the printer (i.e., printer 102, 104, 106, and 108) will be described. By way of non-limiting example, each printer may include a condition evaluator 390 which may include an operational parameters) collector 392. Some operational parameters may be determined based on certain electrical signals, differences in particular electrical signals and/or the absence of a particular electrical signal. By way of non-limiting example, some components including wiring, short circuit, unexpected open circuit may affect an electrical signal value. Therefore, fluctuation of an electrical signal may be a basis of fault condition other than just sensor data.

The condition evaluator 390 of the printer may include a printer self-test module 394 configured to conduct a diagnostic self-test on its components to determine the conditions of one or more printer components. The self-test module 394 may generate self-test data for use by the classifying module 310 to evaluate with other data to determine a current fault condition. The condition evaluator 390 of the printer may include one or more printer sensors 396 to produce sensor data. The sensor data may be communicated to the classifier module 310 for use in classifying a current fault condition.

The condition evaluator data, such as the sensor data, the self-test data and/or other operational parameters may be used by the classifier module 310 in combination with the historical printer condition(s) data (HPCD) in database 302. This data may be processed by the classifier module 310 to determine a condition of a printer such as a fault of a printer which may have caused the printer to stop printing. The HPCD may include historical data associated with the printer including, by not limited to, past component repairs, past faults, and past consumable replacements.

Printer components have a useful life. Thus, the HPCD may maintain or track the current age or remaining useful life of particular components of the instant printer. The HPCD may maintain and/or track quantities of consumable printer components, such as ink and solvents. The HPCD may maintain and/or track time to or between next cleaning cycle or service cycle of the current printer. The HPCD may include data associated with past fault conditions and an estimated time to repair (ETR).

Repairs may have a time function associated therewith which is tracked. The tracked time may be used to alter future recommendations. Data from the historical repair/timing data (HRTD) database 303 may be used by the classifier module to determine whether a repair can be fixed in a certain time interval. The repair time in the HRTD database 303 may be based on a time metric comprising one or more of a repair task standard of time; a repair task deterministic amount of time; and a repair task non-deterministic time. Each repair task may be a function of one of these time metrics. The overall repair time to complete a self-repair process may include multiple repair tasks wherein each repair task may have a time metric selected from at least the repair task standard of time; the repair task deterministic amount of time; and the repair task non-deterministic time. The self-repair process will typically include repair tasks of different time metrics which will be tabulated to determine an estimate time of repair (ETR).

Assume, a user may be instructed to perform a first repair task using a GUI to provide instruction and interaction to determine when the task is done. Assume that the first repair task has a time metric which has a repair task standard of time. The RES maintains a determined standard of time for the user/operator to perform the first repair task. The system may determine whether the user/operator actually performed the function in the predetermined standard of time. The GUI may be used as a user interface to log when the task is complete so that the actual repair time is tracked.

The system may track the amount of time the user/operator used to complete the repair task. The actual time may include the standard of time. Any overage in the standard of time may be due to operating delay in some instances. The RES may also track the total time for the repair task to determine whether the time allotment of the standard of time may be adjusted for future repairs. The RES may track a task completion delay time interval, such as for the printer type, site and/or operator. By way of non-limiting example, any delay in completion such that the standard to time is exceeded, a determination may be made whether the delay was the cause of the operator. For example, the delay may be based on the operator being called away from the task or other external influences. The operator may stop the repair process and go to lunch, for example. Nonetheless, there are other reasons an operator may be called away from the current repair task which can cause the actual time to exceed the expected time. Thus, the actual repair time may be voided or adjusted in some cases so that the training of the classifier is not training with flawed data or unresponsive data. Unresponsive data may be used to define those times the operator may not be responsive in the standard of time to complete the repair task for any reason other than performing the current repair task as expected or according to standards/rules of operation.

Alternatively, the delay may be based on the printer. For the reports module 385, the RES may track the standard of time, any deviations and the reason so that if a repair task cannot be completed in a certain time, the system may stop making such a recommendation if the time to repair is outside of the established standards and thresholds.

The printer may perform an operation associated with a repair task that has a deterministic time interval based on the operation of the printer. By way of non-limiting example, certain printer automated actions or tasks may have a deterministic time interval for completion. The deterministic time interface is essentially machine specific and may not be a function of human interaction.

The printer may perform an operation associated with a repair that has a non-deterministic time interval. In other words, certain repair tasks have time metric which is a function of a non-deterministic time interval based on printer automation. Certain repair tasks have time metric which is a function of both a deterministic time interval and a non-deterministic time interval based on printer automation.

The classifier module may be trained based on whether the recommended repair process was successful wherein the classifier module is trained on which recommended repair processes were not successful. The classifier module may be trained on whether a generated recommendation was not followed, and the resultant outcome led to successful repair in an expected time of repair or LTR threshold. For example, if the recommendation was to replace the printer with a spare but the operator chose to self-repair and such self-repair was performed at or below the line recovery time (LRT) threshold, then the RES would track such success to train the classifier module and for consideration for future repair process recommendations.

The RES may use data to adjust standards of time, the deterministic time intervals and non-deterministic time interval estimates and/or train the classifier module.

The RES may use the data in the HRTD database 303 to generate reports to an administrator or operator to demonstrate to a customer fault LRT savings, operator performance, printer performance, and/or revenue impact. Revenue impact may be a function of more than the amount of time the printer is in a faulted condition or not printing. The revenue impact may include estimated time to the need for the next repair that would require the printer to be in a non-printing state or faulted condition. The revenue impact may include the amount of money lost based on the delay in printing certain surfaces associated with consumable or data sensitive products, by way of non-limiting example.

The methods described herein may be performed in the order shown or a different order. One or more of the blocks may be omitted, skipped or performed contemporaneously. Blocks may be added.

Figure 4:
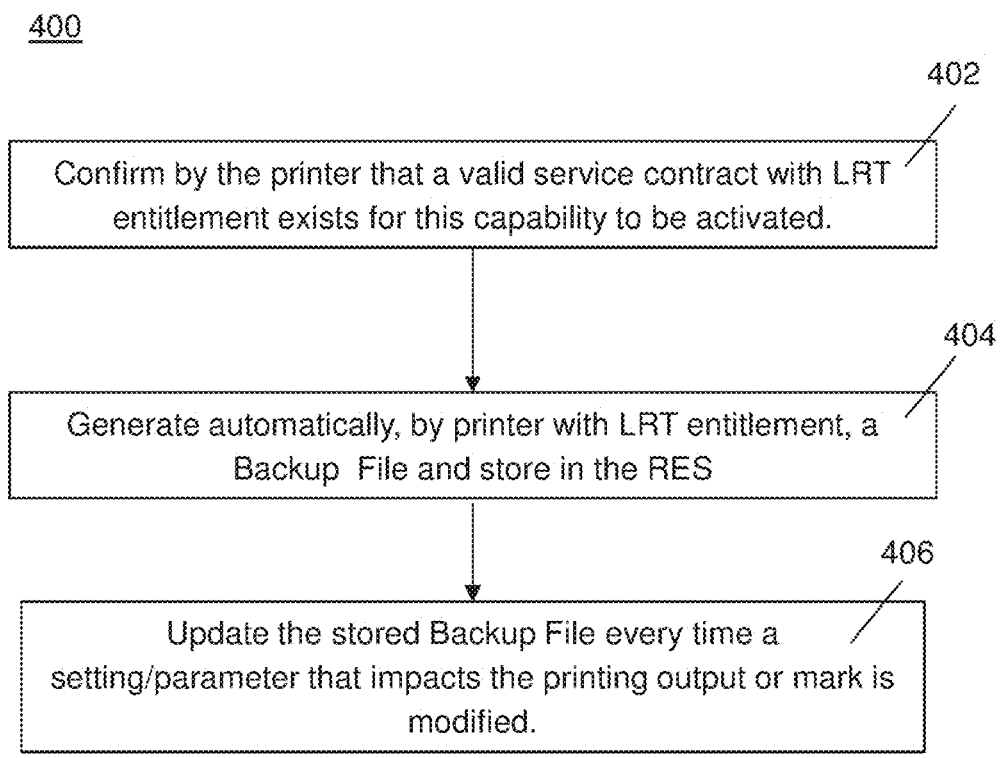
FIG. 4 illustrates a flowchart of a process for backing up printer and batch job metadata based on level of service.

FIG. 4 illustrates a flowchart of a process or method 400 for backing up printer and batch job metadata based on level of service. The method 400 may comprise, at block 402, confirming whether the printer has a valid service contract with LRT entitlement exists for this capability to be activated. The method 400 may comprise, at block 404, automatically generating, via the printer backup file replica 335 (for each printer with LRT entitlement), a Backup File and storing in the RES 150 and/or cloud 280. LRT entitlement is a service contract which provides for repair services to improve line recovery time.

The method 400 may comprise, at block 406, updating the stored Backup File every time a setting/parameter that impacts the printing output is modified. The RES 150 should be able to support Backup Files for 1 to 50 printers, by way of non-limiting example, without any performance degradation.

Figure 5:
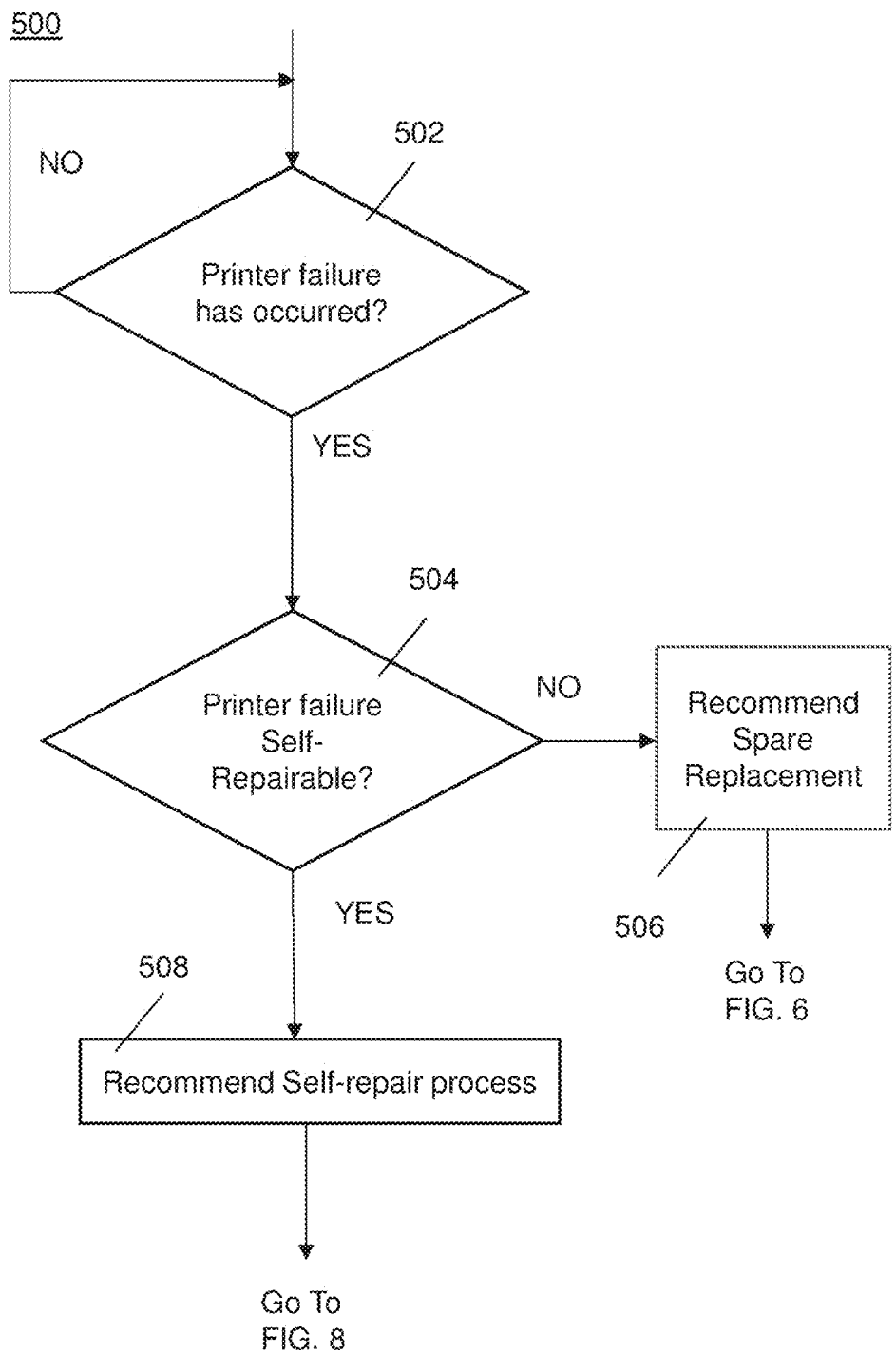
FIG. 5 illustrates a flowchart of a process for determining whether to recommend a self-repair process or a spare replacement process.

FIG. 5 illustrates a flowchart of a process or method 500 for determining whether to perform a self-repair process or a spare replacement process. The method 500 may comprise, at block 502, determining a printer failure has occurred. If the determination is "NO," the method 500 loops back to the beginning. If the determination is "YES," the method may proceed to block 504. A printer failure may be caused by a printer fault which prevents the printer from printing/marking and is down. If there is a failure, the method 500 may comprise, at block 504, determining whether the failure is Self-Repairable. The determination, at block 504, may be a function of the predetermined LRT threshold relative to the estimated time of repair (i.e., ETR01) for a particular fault (i.e., fault condition F01). If the determination is "NO," the method 500 may, at block 506, recommend spare printer replacement. The spare printer replacement process is described in relation to FIG. 6. The recommendation may be communicated via a text message, a message on a printer screen or other display screen of an electronic device. If the determination is "YES." the method 500, at block 508, recommend a self-repair process. The self-repair process is described in relation to FIGS. 8 and 9A-9H.

Figure 6:
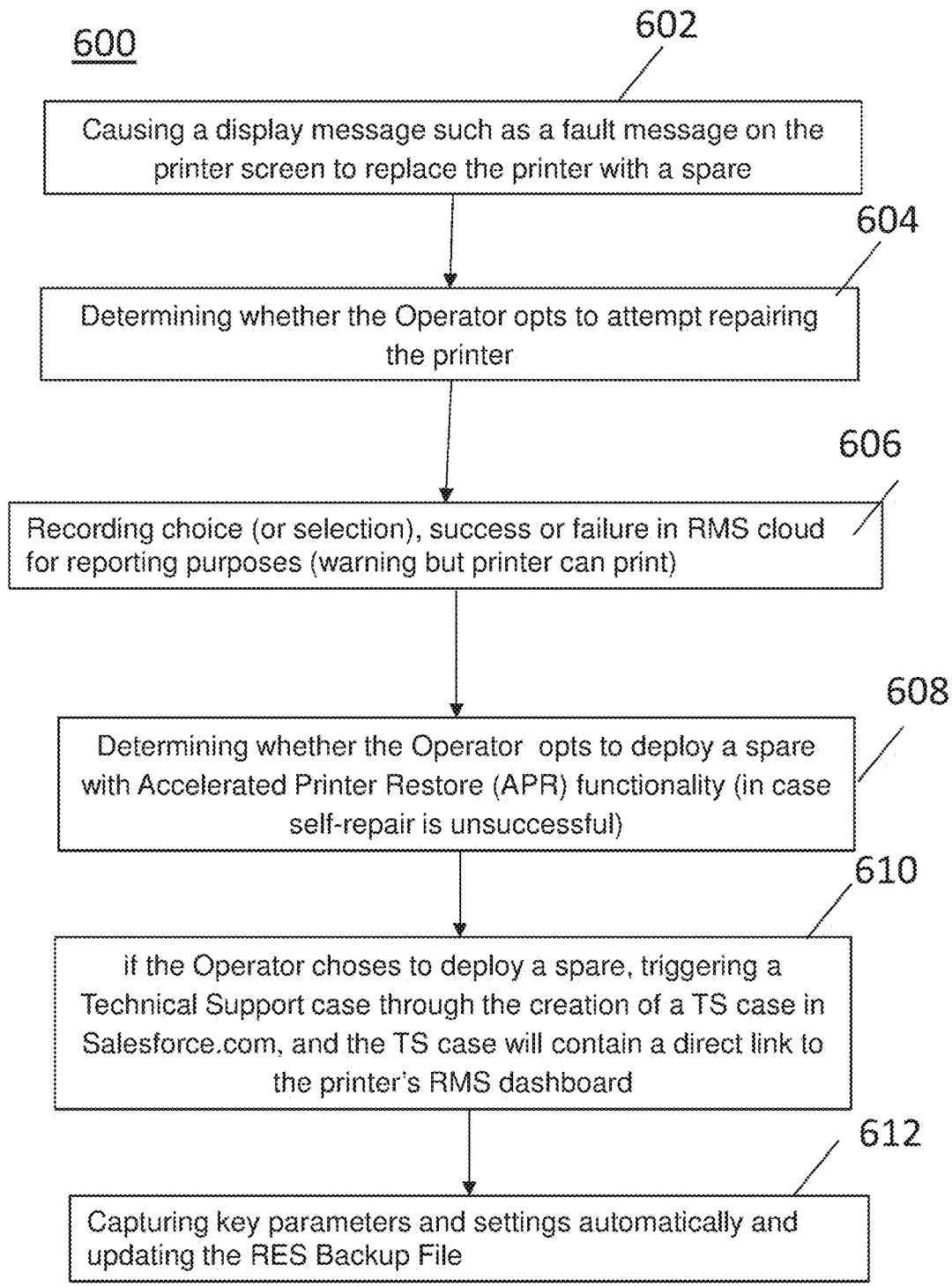
FIG. 6 illustrates a flowchart of a process for user selection of repair options.

FIG. 6 illustrates a flowchart of a process or method 600 for user selection of repair options. The method 600 may comprise, at block 602, causing a display message such as a fault message on the printer screen 205 to replace the printer with an available spare printer (FIG. 1A). In some embodiments, the process may recommend the spare replacement if a self-repair cannot cause a production recovery in less than 20 minutes or other LRT threshold, for example. This may be indicated at the printer in the fault message with a notice of failure and suggestion to deploy a spare printer (driven by classifier module output). The operator may acknowledge the fault and can proceed with spare deployment or opt to attempt repair on his own. The options may be provided in the form of a message and a selection means (button, key, touch screen button or tab).

The method 600 may comprise, at block 604, determining whether the operator opts to attempt repairing the printer. At block 606, record choice (or selection), success or failure in RMS cloud for reporting purposes. A success may include repairs to the printer which can now print but a warning status may ensue. The method 600 may comprise, at block 608, determining whether the operator opts to deploy a spare with Accelerated Printer Restore (APR) functionality (in case self-repair is unsuccessful).

The method 600 may comprise, at block 610, if the operator chooses to deploy a spare, triggering a Technical Support (TS) case through the creation of a TS case in system or remote repair system, and the TS case will contain a direct link (Internet. Intranet or Ethernet) to the printer's remote monitoring service (RMS) dashboard. TS case is created automatically with the TS case number provided to the operator as a reference.

The method 600 may comprise, at block 612, capturing key parameters and settings (metadata) automatically and updating the RES Backup File. The Backup File may be easily identifiable by the operator.

Figure 7:
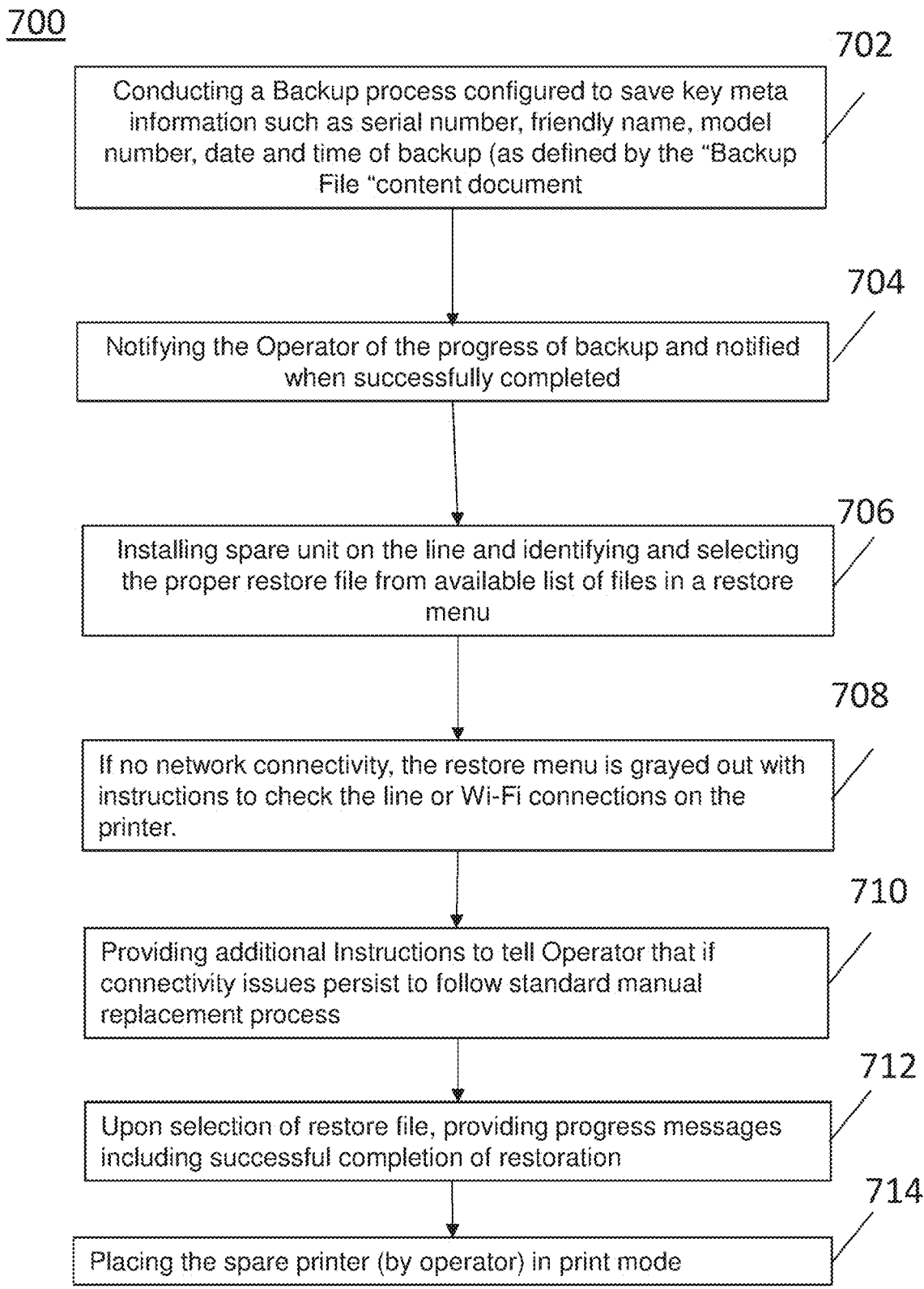
FIG. 7 illustrates a flowchart of a process for installing a spare with printer replication.

FIG. 7 illustrates a flowchart of a process or method 700 for installing a spare with printer replication. The method 700 may comprise, at block 702, conducting a Backup process configured to save key meta information (metadata) such as serial number, friendly name, model number, date and time of backup (as defined by the "Backup File" content document). In some embodiments, the LRT process may be part of a level of repair service contract. The level of repair service contract may be important for sensitive or perishable materials, by way of non-limiting example. Thus, block 702 may be replaced with the blocks of FIG. 4.

The method 700 may comprise, at block 704, notifying the operator of the progress of backup and notified when successfully completed. The progress will be displayed on a computer screen, printer screen, mobile computing device or other screen of a computing device.

The method 700 may comprise, at block 706, installing spare unit on the line and identifying and selecting the proper restore file from available list of files in a restore menu. The installing may be accomplished with the assistance of an operator or technician.

The method 700 may comprise, at block 708, if no network connectivity is sensed, the restore menu is grayed out with instructions to check the line or Wi-Fi connections on the printer. The method 700 may comprise, at block 710, providing additional instructions to tell operator that if connectivity issues persist to follow standard manual replacement process.

The method 700 may comprise, at block 712, upon selection of restore file, providing progress messages (instructions) including successful completion of restore. The method 700 may comprise, at block 714, placing the spare printer (by operator) in print mode. The failed printer may be set aside for an onsite visit by Field Service Engineer, for example. The printer may be shipped offsite for repairs.

Each diagnostic screen may provide self-guided instructions to fix or repair a failed printer. A fault as used herein takes a printer out of printer mode to offline. When a fault occurs, the system will lookup a table to determine if a fault is determined by the classifier module 310 for a sensed fault condition based on real-time sensor data. The condition may include more than one fault such that the fault condition is a multi-fault condition. The classifier module 310 may determine whether the fault condition is suitable for self-repair or not self-repair. Not all faults are classified. Some faults will never be able to be self-repaired. Thus, the need to replace a printer with a spare may be identified early on in the process. The classifier module 310 may not classify faults associated with consumable faults for refilling ink or solvents, for example.

Benefits of the embodiments herein may serve to allow the voice of a customer to be heard in order to address failed printer impacts on daily operation. The recommendation to self-repair or not may depend on the success rate of a particular self-repair process and/or printer. Spare replacement may be used for 24/7 operations and/or operations marking perishable items. Downtime of printers can be very costly beyond printer repair cost. One hour of a perishable item not processed/marked is forever lost and never recouped.

Instructions may be provided for sustained recovery of a printer so that there is a reduction in mean time between faults or repairs although the printer may still provide a warning signal. Instead of clearing a fault, a repair may be sustained. The embodiments herein may reduce line recovery time and take uncertainty out of what is needed when printers fail.

Self-Repairable Process

Figure 8:
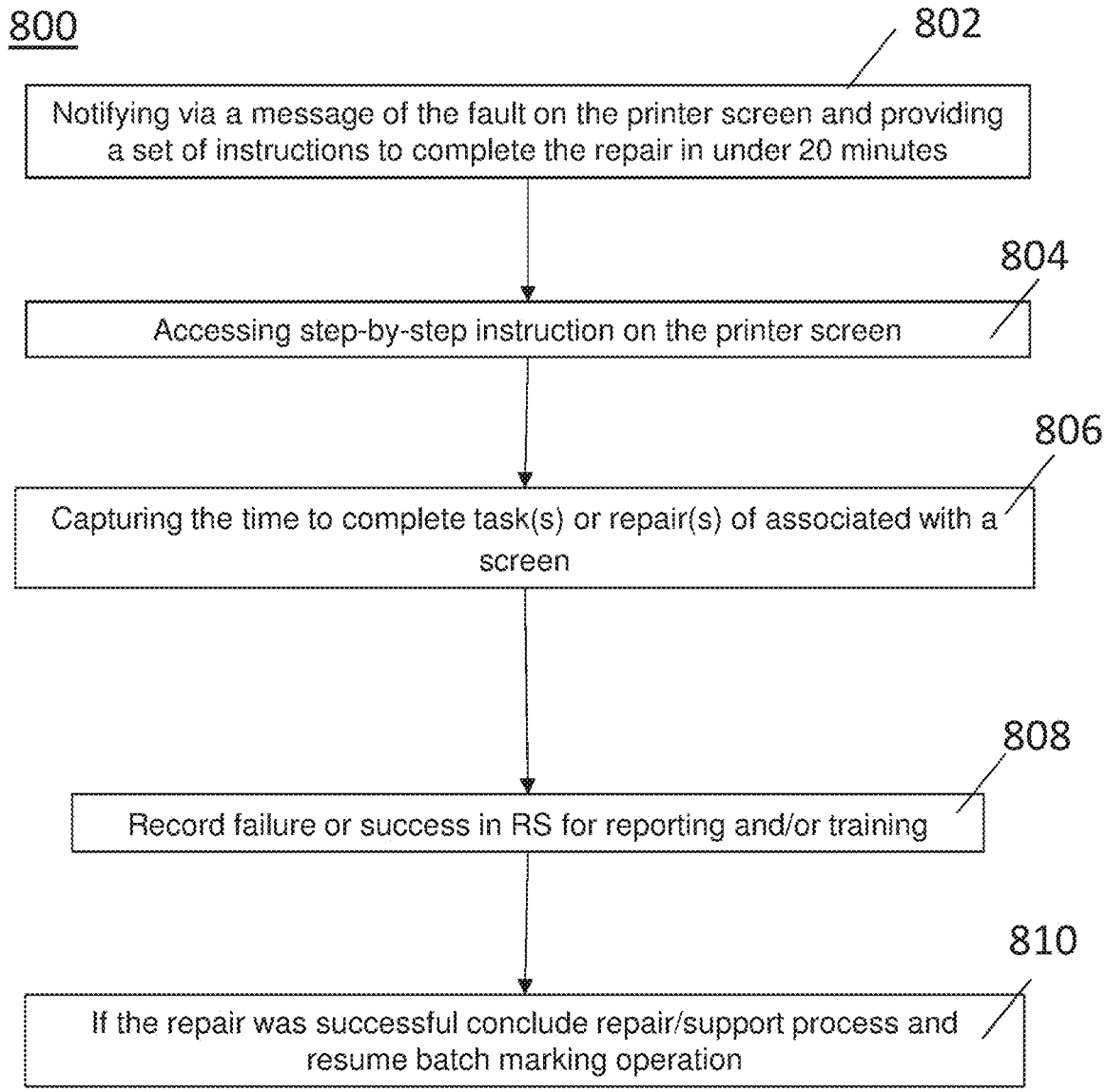
FIG. 8 illustrates a flowchart of a process for reporting line recovery time statistics.

FIG. 8 illustrates a flowchart of a process or method 800 for self-repair. As an operator, when a printer fault that is self-repairable occurs, the method 800 may comprise, at block 802, notifying via a message on a printer screen of the fault and providing a set of instructions to complete the repair in under 20 minutes or LRT threshold. This will be implemented at the printer itself. The fault message will provide notice of failure and suggestion for self-repair (driven by classifier module output). The fault message will display, for example, "Printer failure is self-repairable." and will give the operator a preview of steps necessary to complete self-repair with an option to proceed with self-repair or alternately deploy a spare. If there are multiple faults to fix through the self-repair process, the operator is made aware of the multiple faults.

If the operator elects to deploy a spare printer, one or more blocks of the method 700 in FIG. 7 may be performed. If the operator elects to complete self-repair, he will have the option to follow repair instructions on the printer screen or contact Technical Support for step-by-step guidance via phone. The operator should have the option to stop self-repair and proceed with spare deployment throughout the process.

If the operator opts for guided option through Technical Support, the operator is provided with a local technical support phone number via printer screen. A TS case is auto generated in the system with customer account and site information from the RMS, and standard Work to repair printer. The customer may call Technical Support for guided support. Technical Support Engineer assists the customer in resolving the problem. Technical Support Engineer closes TS case with feedback on the standard work usefulness to help improve the classifier module.

If the operator opts to conduct self-repair on his own, he is able to access step-by-step instruction on the printer screen, at block 804. The instructions may be downloaded in real time or the screens may be pre-stored in the printer's memory. The instructions may be stored in the RES 150 or cloud 280. The operator attempts self-repair. During the repair, the system. RES 150 and/or printer captures the time to complete task(s) or repair(s) of associated with a screen, at block 806. The system may track whether the repairs for the screen were successful before transitioning to the next screen. The process records, at block 808, failure or success for reporting purposes and/or training purposes such as in the cloud. The classifier module may be updated or trained such as if the time to complete repairs is longer than expected. If successful with self-repair, at block 810, then the system may conclude the repair/support process and cause the printer to resume the batch marking operations.

The operator may have the opportunity to provide feedback to the classifier module.

FIGS. 9A-9H illustrate graphical user interfaces (repair screens) 900A, 900B, 900C, 900D, 900E, 900F, 900G and 900H for performing a self-repair process. Assume that FIGS. 9A-9H are a sequence of repair screens to self-repair a fault condition. The fault condition may be associated with one or more faults or errors.

Figure 9A:
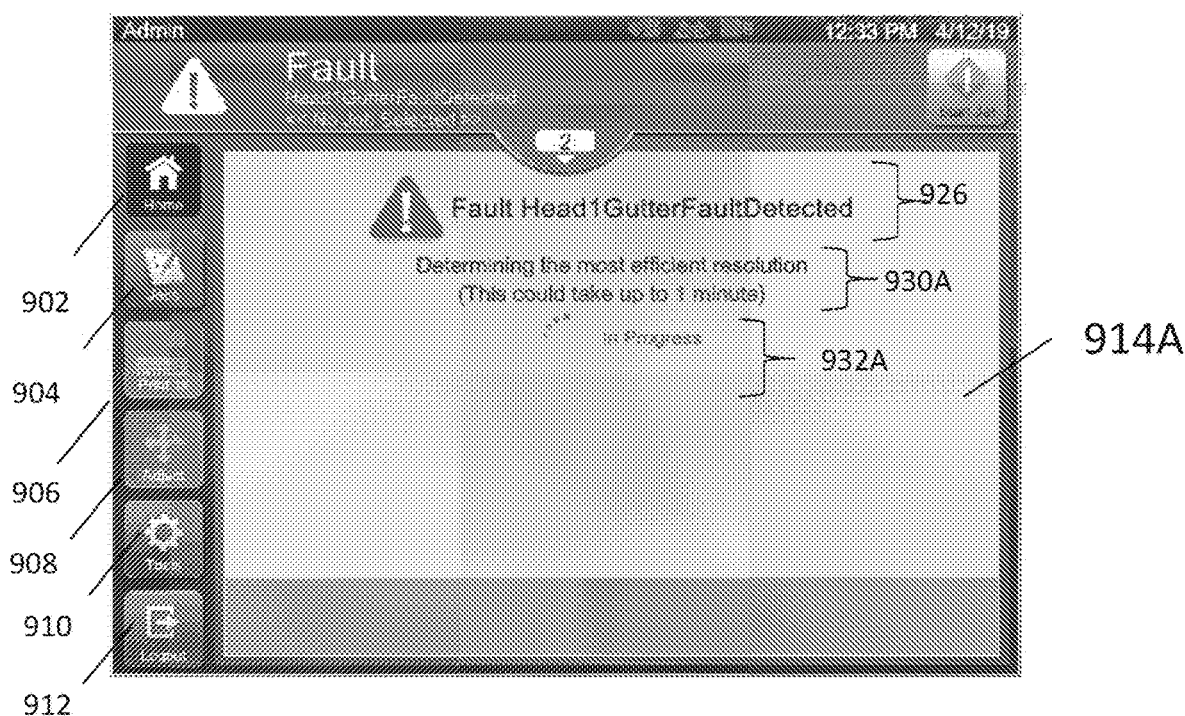
FIGS. 9A-9H illustrate graphical user interfaces for performing a self-repair process.

In FIG. 9A, graphical user interface (GUI) 900A includes a plurality of control or navigation buttons 902, 904, 906, 908, 910 and 912 on a side of a GUI screen 914A. The GUI screen 914A may display a fault message 926. The GUI screen 914A may display a message 930A representative fault condition processing to determine a recommendation such as described in relation to FIG. 5. The GUI screen 914A may display indicators 932A representative of the printer, RES, cloud or other computing device continued processing.

The button 902 causes the printer to navigate to a home page. The button 904 when selected may display information indicative of jobs. The button 906 when selected may cause the printer to print; and the button 908 when selected may navigate to tools for adjusting parameters or settings of the printer. The button 910 when selected may navigate to tools available for operating the printer navigates; and button 912 when selected may logout the operator or technician. Each of the graphical user interfaces 900A, 900B, 900C, 900D, 900E, 900F, 900G and 900H may include the plurality of control or navigation buttons 902, 904, 906, 908, 910 and 912. Therefore, no further description will be provided.

Figure 9B:
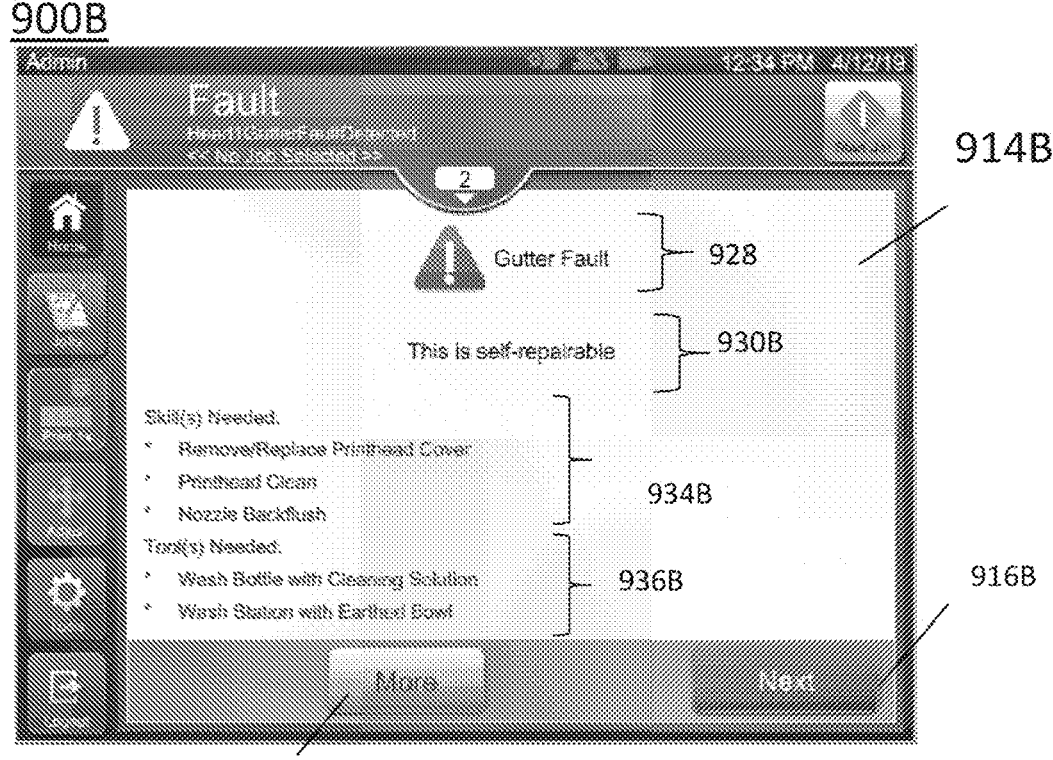

In FIG. 9B, the GUI screen 914B may display a message 928 representative of a particular type of classified fault condition. In this example, the fault condition is "gutter fault." The GUI screen 914B may display recommendation message 930B representative of self-repair in this example. Additionally, the GUI screen 914B may display message 934B representative of a skill set needed for the operator or technician to perform the self-repair process. The GUI screen 914B may display message 936B representative of the tools needed to perform and complete the self-repair process. The GUI screen 914B may display a control button "NEXT" 916B which when selected transitions the sequence from GUI screen 914B to GUI screen 914C. The GUI screen 914B may display a "More" button 918B which when selected navigates to a screen to provide and/or display additional information. Once the button 916B is selected, the time the user stayed on the screen 914B is recorded as the actual time of completion for this screen.

Figure 9C:
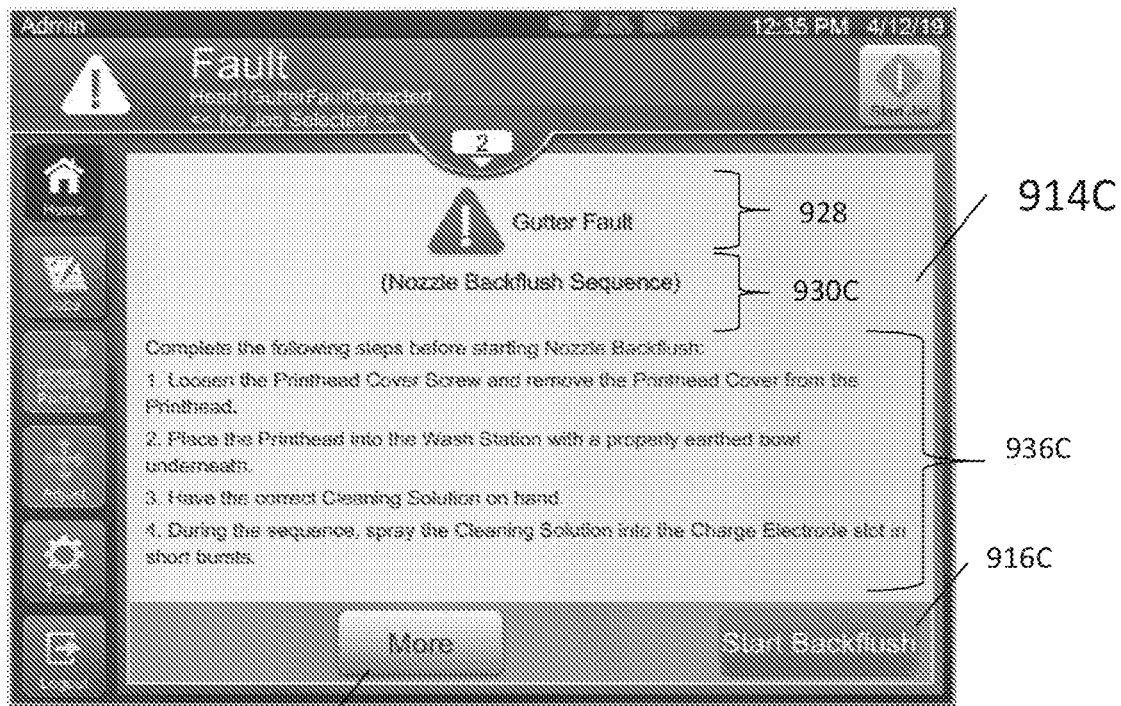

In FIG. 9C, the GUI screen 914C may display the message 928 representative of the particular type of classified fault condition. The GUI screen 914C may display a message 930C representative of a particular sequence to perform. In this example, the sequence is for a Nozzle Backflush Sequence. The GUI screen 914C may display sequence instructions 936C representative of a step by step process to be completed. The GUI screen 914C may include a button 916C representative of starting the backflush process. The GUI screen 914C may display a "More" button 918C which when selected navigates to a screen to provide and/or display additional information. The additional information may be associated with the Nozzle Backflush Sequence.

Figure 9D:
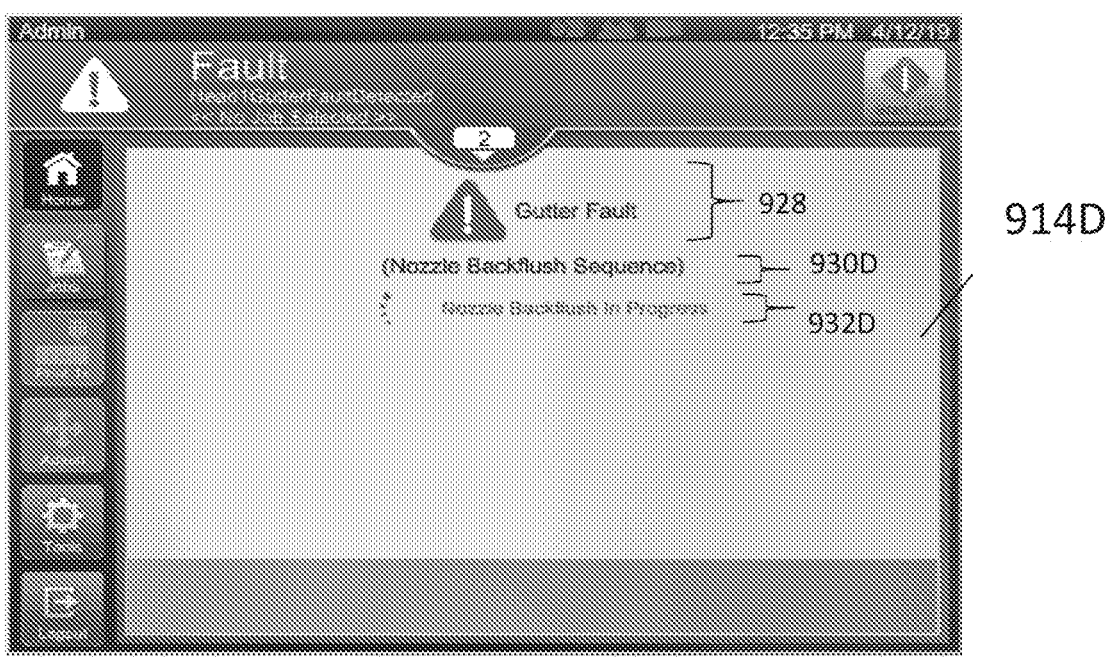

In FIG. 9D, the GUI screen 914D may display the message 928 representative of the particular type of classified fault condition. The GUI screen 914D may display the message 930D representative of the particular sequence (i.e., Nozzle Backflush Sequence). The GUI screen 914D may display indicators 932D representative of continued processing of the backflush process. Once the repair process associated with the GUI screen 914D, the actual time of completion is recorded.

Figure 9E:
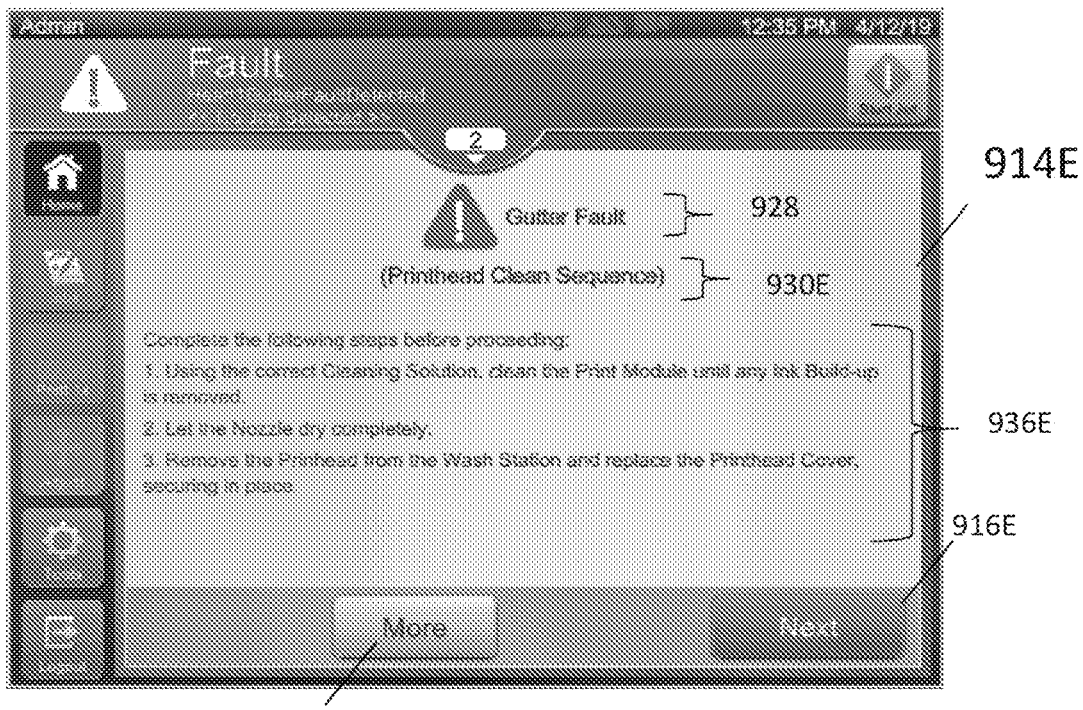

In FIG. 9E, the GUI screen 914E may display the message 928 representative of the particular type of classified fault condition. The GUI screen 914E may display a message 930E representative of another particular sequence to perform. In this example, the sequence is for a Pinhead Clean Sequence. The GUI screen 914E may display sequence instructions 936E representative of a step by step process to be completed. The GUI screen 914E may include a button 916E representative of navigating to a next screen, for example. The GUI screen 914E may display a "More" button 918E which when selected navigates to a screen to provide and/or display additional information. The additional information may be particular to the Pinhead Clean Sequence.

Figure 9F:

In FIG. 9F, the GUI screen 914F may display the message 928 representative of the particular type of classified fault condition. The GUI screen 914F may display a message 930F representative of yet another particular sequence to perform. In this example, the sequence is for a Start Jet Sequence. The GUI screen 914F may display sequence instructions 936F representative of at least one step to be completed. The GUI screen 914F may include a button 916F which when selected causes the identified sequence to start, for example. The GUI screen 914F may display a "More" button 918F which when selected navigates to a screen to provide and/or display additional information. The additional information may be particular to the Start Jet Sequence. The system may record the actual time of completion for this sequence.

Figure 9G:
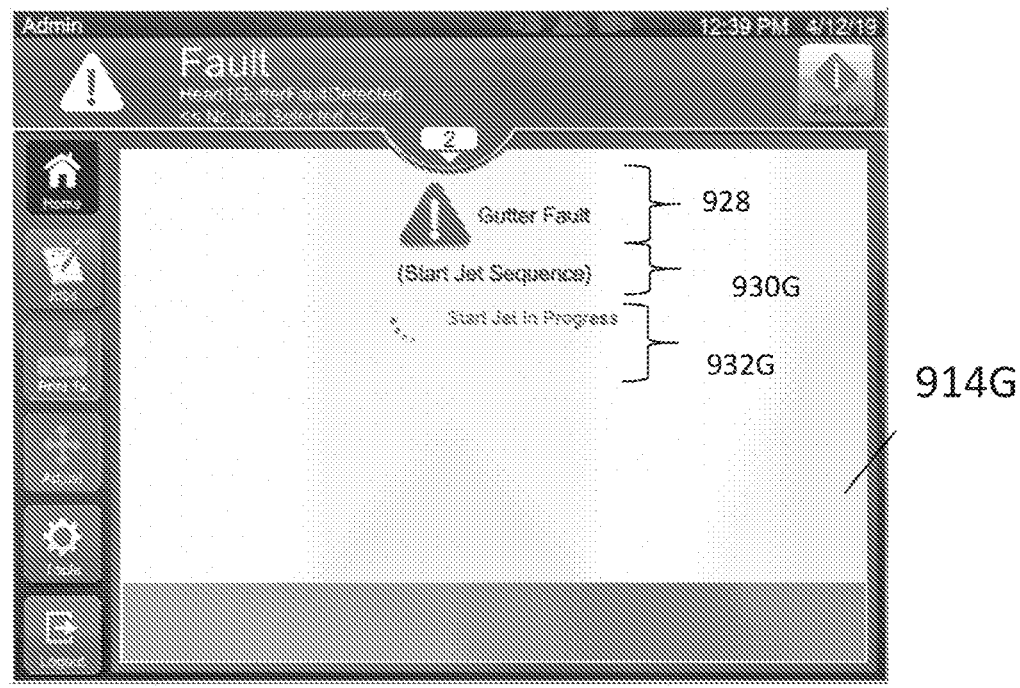

In FIG. 9G, the GUI screen 914G may display the message 928 representative of the particular type of classified fault condition. The GUI screen 914G may display message 930G representative of the Start Jet Sequence. However, in this GUI screen 914G, display indicators 932G are provided being representative of the printer, RES, cloud or other computing device continued processing of the Start Jet Sequence.

Figure 9H:
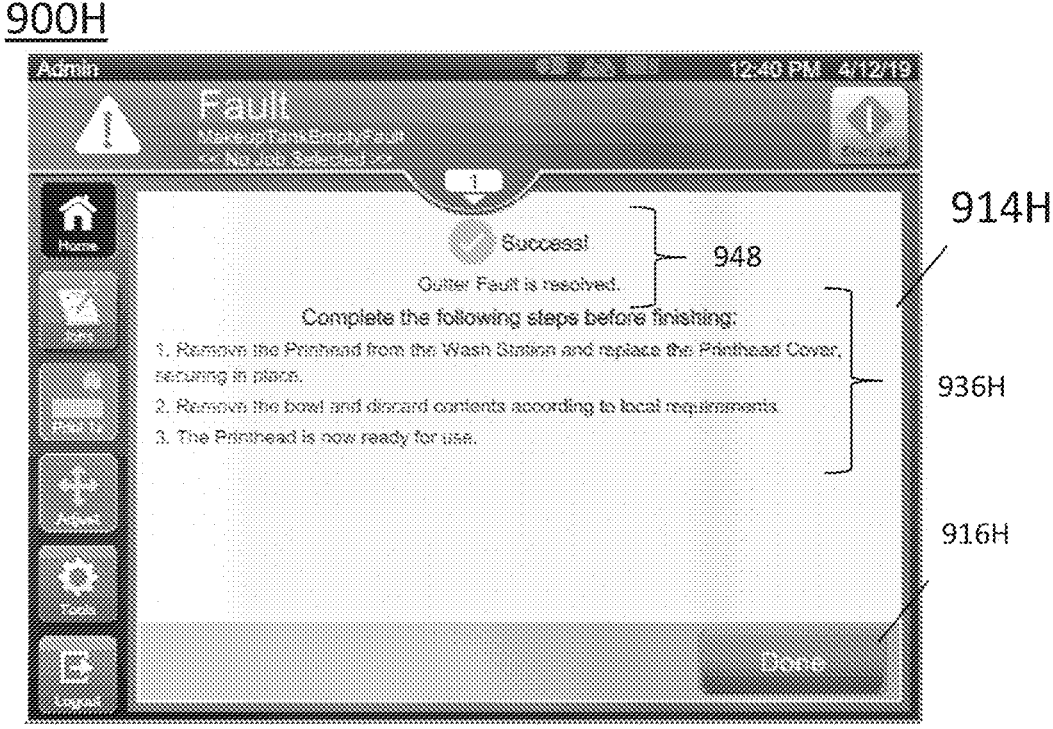

In FIG. 9H, the GUI screen 914H may display a message 948 representative of a successful self-repair. The GUI screen 914H may display additional instructions 936H to complete the self-repair and bring the printer online to continue its printing or marking process of the batch. The GUI screen 914H may display a "Done" button 916H which when selected is representative of completion of the instructions 936H. The actual time of completion may also be recorded for tracking, training and updating the engine.

LRT Performance Reporting

FIG. 10 illustrates a flowchart of a process or method 1000 for reporting line recovery time statistics. Fault session associated with the line recovery time may record all or essentially all event data and tasks performed and store repair event data and performed tasks in the cloud for customer to run reports and to assess the system's performance. Information may include all choices a user, operator or technician made along the way and the actual time at each recovery screen to make determinations whether self-repair tasks can be complete in 20 minutes or within the LRT threshold, for example, for a particular fault condition. Remote monitoring service (RMS) may monitor printers for faults and current status.

Line recovery time may leverage data analytics and printer backup and restore capabilities to reduce customer production downtime due printer failure. Some repairs take 50 minutes. The embodiments herein may reduce to 20 minutes per event, in some instances. However, while a spare replacement may take longer to put in operation, the mean time between expected failures for a particular fault may save time in production downtime overall.

Leveraging data analytics, may reduce customer downtime from printer failures by identifying easy self-repairs and providing the customer with step-by-step repair instructions to accelerate recovery. When self-repair is not possible, the process will accelerate replacement of the failed printer with spare through local backup and restore. The embodiments may accelerate onsite response to repair down printer(s) with proactive dispatch of local field service when spare printer is deployed.

The method 1000 may comprise, at block 1002, generating a report via the Remote Monitoring Service dashboard that details the performance and value created by Line Recovery Time (LRT) for a facility. This will be implemented in the RMS dashboard and accessible by Operations Managers and or personnel designated.

The method 1000 may comprise, at block 1004, generating in the report the number of failures that occurred in a specified period by printer and in total [faults that resulted in more than 1 minute of no printing].

The method 1000 may comprise, at block 1006, calculating and identifying in the report the number of failures self-repaired vs. spares deployed [number of times the operator successfully self-repaired a printer based on operator's feedback to the classifier module, number of spares deployed based on number of backups that were restored within 20 minutes or restoration time interface (RTI)].

The method 1000 may comprise, at block 1008, calculating and identifying, in the report the number of downtime minutes by printer or by site [downtime is calculated as time from failure to self-repair or spare deployment completion].

The method 1000 may comprise, at block 1010, identifying in the report production downtime per printer failure compared to "theoretical would have been downtime" for value illustration [actual recovery time per event vs. a standard (50) minutes].

The method 1000 may comprise, at block 1012, calculating and identifying in the report the number of Self-Repair opportunities vs. the number of times the operator opted to deploy spare instead of attempt repair.

The method 1000 may comprise, at block 1014, calculating and identifying in the report the number of Spare deployment opportunities vs. the number of times the operator opted to attempt repair instead of deploying spare.

Managers may be able to run a report providing the number of failures that occurred in a specified period. The report may provide Managers with number of failures self-repaired vs. spares deployed and service dispatched. The report may provide the Managers with the number of Self-Repairable events where repair was successfully complete, repair failed and spare deployed, customer opted out of repair and deployed spare. The report may provide Managers with the number of Self-Repair opportunities vs. the number of times operator opted to deploy spare instead of attempt repair.

The report may provide Managers with the number of Spare deployment opportunities vs. the number of times the operator opted to attempt repair instead of deploying spare.

The data may represent how often customers are attempting self-fix and being successful. The report may include data to segment customers into different entitlement groups (LRT vs. not, contract type vs contract type, etc.) by customer account, site, region, or global.

FIGS. 11A-11B illustrate graphical user interfaces 1100A and 1100B for displaying reports such as on a computer system. The reports GUI 1100A may include information associated with a total number of faults for a number of printers in box 1102A. The reports GUI 1100A may include statistics associated with the number of replacements vs. the number of self-repairs in box 1104A. The reports GUI 1100A may include statistics associated with an average fix time in box 1106A. The reports GUI 1100A may include statistics associated with an average deploy of spare time in box 1108A. The reports GUI 1100A may include statistics associated with recommended adoption vs. abandonment of a recommendation in box 1110A. An operator may choose a different option than recommended. The reports GUI 1100A may include statistics associated with suggestion effectiveness in box 1112A. The suggestion effectiveness is a function of the number of LRT events which the actual time of completion was within or satisfied the LRT threshold. The information is tracked by site, printer or printer type, fault type and time increments.

The reports GUI 1100A may include data selection fields 1120A for selecting and/or filtering report data by site, printer or printer type, fault type and time increments. Time increments may be last 30 days, for example. Other increments may be on a yearly basis, semi-annual basis, 90-day basis, 60-day basis or other time interval. The statistics may be displayed using bar graphs, ring segmentation or other statistical representations. For example, a pie graph or line graphs may be used.

The reports GUI 1100B of FIG. 11B is similar to reports GUI 1100A in FIG. 11A. Therefore, only the differences will be described in detail. In reports GUI 1100B may include statistics associated with successful completion of a suggested self-repair; fix failed with spare deployed, opted out and deployed spare; and opted out and self-repair performed.

Computational Hardware Overview

FIG. 12 is a block diagram that illustrates a computer system 1200 (i.e., RES 150) upon which an embodiment of the invention may be implemented or employed. The computer system 1200 may be a server running server applications. The server may be a web server. The RES 150 may be coupled to printers via a network. The terms computing system, computing device, server and computer system may be used interchangeably herein. The term engine may include computing devices or components of a computer system, as well. Computer system 1200 includes a communication mechanism such as a bus 1210 for passing information between other internal and external components of the computer system 1200. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more blocks of one or more methods described herein. Thus, the computer system is a special purpose computer system.

A sequence of binary digits constitutes digital data that is used to represent a number or code for a character. A bus 1210 includes many parallel conductors of information so that information is transferred quickly among devices coupled to the bus 1210. One or more processors 1203 for processing information are coupled with the bus 1210. A processor 1203 performs a set of operations on information. The set of operations include bringing information in from the bus 1210 and placing information on the bus 1210. The set of operations also typically includes comparing two or more units of information, shifting positions of units of information, and combining two or more units of information, such as by addition or multiplication. A sequence of operations to be executed by the processor 1203 constitutes computer instructions.

Computer system 1200 also includes a memory 1204 coupled to bus 1210. The memory 1204, such as a random access memory (RAM) or other dynamic storage device, stores information including computer instructions. The memory 1204 may also include dynamic memory which allows information stored therein to be changed by the computer system 1200. RAM allows a unit of information stored at a location called a memory address to be stored and retrieved independently of information at neighboring addresses. The memory 1204 is also used by the processor 1203 to store temporary values during execution of computer instructions. The computer system 1200 also includes a read only memory (ROM) 1206, non-volatile persistent storage device or static storage device coupled to the bus 1210 for storing static information, including instructions, that is not changed by the computer system 1200. The ROM 1206 may be a secure byte-addressable memory (storage) device or a direct-access for files (DAX) memory device. The bus 1210 may also have coupled thereto other storage devices including a non-volatile (persistent) storage device, such as a magnetic disk or optical disk, for storing information, including instructions, that persists even when the computer system 1200 is turned off or otherwise loses power.

Information, including instructions, is provided to the bus 1210 for use by the processor from an external input device 1213, such as a keyboard containing alphanumeric keys operated by a human user, or a sensor. A sensor detects conditions in its vicinity and transforms those detections into signals compatible with the signals used to represent information in computer system 1200. Other external devices coupled to bus 1210, used primarily for interacting with humans, include a display device 1214, such as a cathode ray tube (CRT) or a liquid crystal display (LCD), light emitting diode (LED) displays, for presenting images, and a pointing device 1216, such as a mouse or a trackball or cursor direction keys, for controlling a position of a small cursor image presented on the display device 1214 and issuing commands associated with graphical elements presented on the display 1214.

In the illustrated embodiment, special purpose hardware, such as an application specific integrated circuit (IC) 1230, may be coupled to bus 1210. The special purpose hardware may be configured to perform operations not performed by processor 1203 quickly enough for special purposes. Examples of application specific ICs include graphics accelerator cards for generating images for display device 1214, cryptographic boards for encrypting and decrypting messages sent over a network, speech recognition, and interfaces to special external devices.

Computer system 1200 also includes one or more instances of a communications interface 1270 coupled to bus 1210. Communication interface 1270 provides a two-way communication coupling to a variety of external devices that operate with their own processors, such as printers, scanners and external disks.

The communication interface 1270 may receive data from printers or other peripheral devices. Pointing device 1216, input device 1213 and display device 1214 may be associated with host computer 1282.

In general, the computer system 1200 through the communication interface 1270 may be coupled with a network link 1278 that is connected to a local network 1280 to which a variety of external devices with their own processors are connected. In some embodiments, the local network 1280 may be a private network and may include wired and/or wireless communications. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 may be a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1270 sends and receives electrical, acoustic or electromagnetic signals, including infrared and optical signals, that carry information streams, such as digital data.

The term computer-readable medium is used herein to refer to any medium that participates in providing information to processor 1203, including instructions for execution. Such a medium may take many forms, including, but not limited to, non-volatile media, volatile media and transmission media. Non-volatile media include, for example, optical or magnetic disks, such as storage device. Volatile media include, for example, dynamic memory 1204. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1203, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1203, except for carrier waves and other signals.

Logic encoded in one or more tangible media includes one or both of processor instructions on a computer-readable storage media and special purpose hardware, such as ASIC 1230.

Network link 1278 typically provides information communication through one or more networks to other devices that use or process the information. For example, network link 1278 may provide a connection through a private or local network 1280 to a host computer 1282, such as a secure host computer. For example, in some embodiments, the pilot may be located at the host computer 1282. Thus, the user interfaces may be located with the host computer 1282. The host computer 1282 may also update and/or control the RES 150 from a remote location based on user responses or training session trends, by way of non-limiting example.

In some embodiments, the computer system 1200 may connect to equipment 1284 operated by an Internet Service Provider (ISP) or Intranet Service Provider. ISP equipment 1284 in turn provides data communication services through the public, world-wide packet-switching communication network of networks now commonly referred to as the Internet 1290 or alternately over an Intranet. A computer called a server 1293 connected to the Internet or Intranet provides a service in response to information received over the Internet or Intranet. For example, server 1293 provides information representing video data for presentation at display 1214 or the server may receive information representing video data. The cloud 280 may be accessible by computer system 1200 (i.e., RES 150) via ISP equipment 1284. The host 1282 may be part of the remote monitoring service (RMS) platform for communicating with and between the RES 150 and printers.

The invention is related to the use of computer system 1200 for implementing the techniques described herein. According to one embodiment of the invention, those techniques are performed by computer system 1200 in response to processor 1203 executing one or more sequences of one or more instructions contained in memory 1204 to form a computer program product. Such instructions, also called software and program code, may be read into memory 1204 from another computer-readable medium such as storage device 1208. Execution of the sequences of instructions contained in memory 1204 causes processor 1203 to perform the method blocks described herein. In alternative embodiments, hardware, such as application specific integrated circuit 1230, may be used in place of or in combination with software to implement the invention. Thus, embodiments of the invention are not limited to any specific combination of hardware and software.

Computer program code for carrying out operations described above may be written in a variety of programming languages, including but not limited to a high-level programming language, such as without limitation. C or C++, for development convenience. In addition, computer program code for carrying out operations of embodiments described herein may also be written in other programming languages, such as, but not limited to, interpreted languages. The program code may include hardware description language (HDL) or very high speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server 1292 transmits program code for a particular application, requested by a message sent from computer 1200, through Internet 1290, ISP equipment 1284, local network 1280 and communications interface 1270. The received code may be executed by processor 1203 as it is received or may be stored in storage device 1208 or other non-volatile storage for later execution, or both. In this manner, computer system 1200 may obtain application program code in the form of a signal on a carrier wave.

Various forms of computer readable media may be involved in carrying one or more sequence of instructions or data or both to processor 1203 for execution. For example, instructions and data may initially be carried on a magnetic disk of a remote computer such as host computer 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red a carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1203 retrieves and executes the instructions using some of the data sent with the instructions. The instructions and data received in memory 1204 may optionally be stored on storage device 1208, either before or after execution by the processor 1203.

The memory 1204 may have stored thereon applications implemented as software or computer instructions. The applications when executed by the processor 1203 may perform one or more functions, steps or methods as described herein.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes." "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A method comprising:
   operating a marking and coding device;
   classifying, by a classifying module, a fault condition based on one or more of received sensor data, printer self-test data, current operational data and historical device condition data;
   determining autonomously a repair process recommendation, in response to the classified fault condition and based on an estimated time to repair (ETR) the marking and coding device using a self-repair recovery process relative to a line recovery time threshold (LRT threshold); and
   recommending, by at least one processor, as the repair process recommendation, the self-repair recovery process in response to the ETR being less than or equal to the LRT threshold.

2. The method of claim 1, further comprising:
   storing device metadata and batch job metadata in a backup file; and
   replicating the faulted device by a spare device by downloading the stored device metadata and batch job metadata to configure the spare device.

3. The method of claim 1, further comprising:
   providing an option to override the recommendation.

4. The method of claim 1, further comprising:
   replacing the faulted device with a spare printer online.

5. The method of claim 1, further comprising conducting the self-repair recovery process, comprising:
   communicating instructions in one or more timed repair screens;
   tracking a time to complete each repair screen associated with a repair task; and
   measuring the tracked time until self-repair is complete.

6. The method of claim 1, further comprising conducting the self-repair recovery process, comprising:
   tracking line recovery time statistics (LRT statistics) associated with each resolved fault condition.

7. The method of claim 6, wherein the LRT statistics comprises a statistic associated with a mean time between faults associated with a completed self-repair.

8. The method of claim 1, further comprising:
   providing an option to override the recommendation;
   replacing the faulted device with a spare device online; and
   replicating the faulted device by the spare device by downloading stored device and batch job metadata to configure the spare device.

9. The method of claim 1, further comprising:
   tracking an actual time to complete the self-repair recovery process associated with the repair process recommendation;
   tracking, during the self-repair recovery process, statistics associated with at least one of adoption of the recommendation, average time to complete the self-repair recovery process; average time to deploy a spare device; and
   selectively reporting the tracked statistics.

10. The method of claim 9, further comprising tracking a performance of an operator based on the tracked statistics and reporting the performance.

11. The method of claim 9, further comprising tracking a performance of a type of the device and reporting the performance.

12. The method of claim 1 wherein the fault condition comprises a fault associated with one or more of a print head and an ink system associated with the coding or marking device.

13. The method of claim 12, wherein the fault relating to the print head comprises one or both of a gutter fault and an EHT fault.

14. The method of claim 13, wherein the EHT fault is associated with one or more parameters comprising voltage, current, trip value, and percentage of trip.

15. The method of claim 13, wherein the gutter fault is associated with one or more parameters comprising gutter ink build up, a time since last gutter clean, a warning level setting, and presence of ink in the gutter.

16. The method of claim 12 wherein the fault condition associated with the ink system comprises one or more of an ink reservoir fault and a makeup tank fault.

17. The method of claim 12, wherein the fault condition is associated with at least one of: in reservoir parameters comprising ink type, ink expiry date, fluid level, print hours remaining, and ink reservoir temperature; make up reservoir parameters comprising at least one of make up type, expiry date, makeup vacuum, fluid level, print hours remaining, and makeup tank temp; viscometer parameters comprising at least one of target time to empty, actual time to empty, density; and viscosity, wherein the viscometer parameters are related to ink reservoir faults and makeup tank faults.

18. A system comprising:
    one or more marking and/or coding devices; and
    a computing system coupled to the one or more marking and/or coding devices and comprising at least one processor configured to:
    classify, by a classifying module, a fault condition of a respective one marking and/or coding device based on one or more of received sensor data, printer self-test data, current operational data and historical printer condition data;
    determine autonomously a repair process recommendation, in response to the classified fault condition and, based on an estimated time to repair (ETR) the respective one marking and/or coding device using a self-repair recovery process relative to a line recovery time threshold (LRT threshold); and
    recommend, by the at least one processor, as the repair process recommendation, the self-repair recovery process in response to the ETR being less than or equal to the LRT threshold.

19. The system of claim 18, wherein the at least one processor of the computing system further configured to:
    store device metadata and batch job metadata in a backup file for each device; and
    replicate the faulted respective one device by a spare device by downloading the stored device and batch job metadata to configure the spare device.

20. The system of claim 18, wherein the at least one processor of the computing system further configured to:
    provide an option to override the recommendation.

21. The method of claim 1, wherein the LRT threshold comprises a threshold for a recovery time from the fault condition associated with a production line that is to output products, wherein the marking and coding device is operated for marking or coding the products being output from the production line.

22. The system of claim 18, wherein the LRT threshold comprises a threshold for a recovery time from the fault condition associated with a production line that is to output products, wherein the marking and coding device is operated for marking or coding the products being output from the production line.

* * * * *